(12) United States Patent
Brennetot et al.

(10) Patent No.: US 11,473,605 B2
(45) Date of Patent: Oct. 18, 2022

(54) PRELOAD CONTROLLED STUD LOCKBOLT

(71) Applicant: Arconic Inc., Pittsburgh, PA (US)

(72) Inventors: Thomas Brennetot, Conflans-Sainte-Honorine (FR); Arnaud Brunet, Bezu-Saint-Eloi (FR); Christophe Coulon, Achéres (FR)

(73) Assignee: HOWMET AEROSPACE INC., Pittsburgh, PA (US)

( * ) Notice: Subject to any disclaimer, the term of this patent is extended or adjusted under 35 U.S.C. 154(b) by 272 days.

(21) Appl. No.: 16/776,732

(22) Filed: Jan. 30, 2020

(65) Prior Publication Data
US 2020/0166066 A1    May 28, 2020

Related U.S. Application Data

(63) Continuation of application No. PCT/US2018/051053, filed on Sep. 14, 2018.

(60) Provisional application No. 62/561,877, filed on Sep. 22, 2017.

(51) Int. Cl.
| | | |
|---|---|---|
| *F16B 19/05* | (2006.01) | |
| *F16B 23/00* | (2006.01) | |
| *F16B 39/02* | (2006.01) | |
| *F16B 35/04* | (2006.01) | |
| *F16B 31/02* | (2006.01) | |

(52) U.S. Cl.
CPC .......... *F16B 19/05* (2013.01); *F16B 23/0061* (2013.01); *F16B 35/04* (2013.01); *F16B 39/025* (2013.01); *F16B 39/026* (2013.01); *F16B 31/021* (2013.01)

(58) Field of Classification Search
CPC .......... F16B 19/05; F16B 30/02; F16B 35/04; F16B 35/041; F16B 35/042
See application file for complete search history.

(56) References Cited

U.S. PATENT DOCUMENTS

| 1,373,045 | A | * | 3/1921 | Bernhard | ............... F16B 39/08 |
|---|---|---|---|---|---|
| | | | | | 411/522 |
| 4,180,228 | A | * | 12/1979 | Snyder | ..................... F16L 3/04 |
| | | | | | 411/388 |
| 4,681,496 | A | | 7/1987 | Fasolino | |
| 6,341,917 | B1 | * | 1/2002 | Schubring | ......... B29C 66/73921 |
| | | | | | 403/299 |
| 10,876,556 | B2 | * | 12/2020 | Cipriano | ............... F16B 5/0275 |

(Continued)

FOREIGN PATENT DOCUMENTS

| CN | 202597403 U | 12/2020 |
|---|---|---|
| KR | 10-2017-0009762 A | 1/2017 |
| WO | 0032948 A1 | 6/2000 |

*Primary Examiner* — Flemming Saether
(74) *Attorney, Agent, or Firm* — Greenberg Traurig, LLC

(57) ABSTRACT

A fastener including a pin member having a shank portion, a threaded portion having a thread, a lock portion having at least one lock groove, and a pull portion located having at least one pull groove. The threaded portion is adapted to be engaged threadedly with a threaded hole of a workpiece to install the pin member therein. The fastener includes a swage collar adapted to be installed into the at least one lock groove of the lock portion to secure a plurality of workpieces. The pull portion is adapted to break off when the fastener is installed.

11 Claims, 24 Drawing Sheets

(56) References Cited

U.S. PATENT DOCUMENTS

2003/0147718 A1\* 8/2003 McDowell ................ F16B 5/04
411/396
2004/0091331 A1 5/2004 Schultz
2004/0265090 A1 12/2004 Stone
2005/0123373 A1 6/2005 Hufnagl et al.

\* cited by examiner

PRELOAD CONTROLLED STUD LOCKBOLT

CROSS-REFERENCE TO RELATED APPLICATION

This application is a continuation application relating to and claiming the benefit of commonly-owned, co-pending International Patent Application No. PCT/US2018/051,053, filed Sep. 14, 2018, entitled "PRELOAD CONTROLLED STUD LOCKBOLT", which relates to and claims the benefit of commonly-owned U.S. Provisional Patent Application Ser. No. 62/561,877, filed Sep. 22, 2017, entitled "PRELOAD CONTROLLED STUD LOCKBOLT," the entirety of each of which is incorporated by reference herein.

TECHNICAL FIELD OF THE INVENTION

The present invention relates to fasteners and, more particularly, a lockbolt fastening system including a pin member and a swage collar adapted to be swaged onto the pin member.

BACKGROUND OF THE PRIOR ART

Two-piece swaged fasteners, commonly referred to as lockbolts, are used to secure a plurality of workpieces together. Typically, swage-type fasteners include a pin member having lock grooves and a swage collar adapted to be swaged into the lock grooves of the pin member by a fastener installation tool.

DISCLOSURE OF THE INVENTION

In an embodiment, a fastener including a pin member including an elongated shank portion having a first end, a second end opposite the first end, a smooth cylindrical shank portion having a first end and a second end opposite the first end of the smooth cylindrical shank portion, a threaded portion located adjacent to the first end of the smooth cylindrical shank portion and proximate to the first end of the elongated shank portion and having a thread, a lock portion located adjacent to the second end of the smooth cylindrical shank portion and having at least one lock groove, and a pull portion located at the second end of the elongated shank portion and having at least one pull groove; and a collar.

In an embodiment, the collar is a swage collar adapted to be swaged into the at least one lock groove of the lock portion of the pin member. In an embodiment, the at least one lock groove of the lock portion of the pin member includes a plurality of lock grooves. In an embodiment, the elongated shank portion of the pin member includes a breakneck groove located intermediate the lock portion and the pull portion. In an embodiment, the at least one pull groove of the pull portion of the pin member includes a plurality of pull grooves. In an embodiment, the fastener is adapted to secure at least first and second workpieces to one another, wherein the first workpiece includes a hole extending from a first side thereof to a second side thereof opposite the first side, the hole being sized and shaped to receive the pin member therethrough, and wherein the second workpiece includes a threaded hole extending within a first side thereof, the threaded hole being sized and shaped and adapted to receive threadedly the thread of the threaded portion of the pin member when the pin member is in an installed position. In an embodiment, the lock portion of the pin member protrudes from the first side of the first workpiece and the collar is adapted to be positioned on the lock portion of the pin member and adjacent to the first side of the first workpiece when the pin member is in its installed position. In an embodiment, the pull portion is adapted to break off from the pin member at the breakneck groove.

In an embodiment, the lock portion of the pin member includes an annular stop located at one end thereof and proximate to the pull portion of the pin member. In an embodiment, the fastener includes a plurality of grooves each of which extends axially from and on an outer surface of the stop to and on an outer surface of the lock portion. In an embodiment, the lock portion of the pin member includes a head located at one end thereof and proximate to the pull portion of the pin member. In an embodiment, the head includes gripping means adapted to facilitate the gripping and rotation of the fastener from an installed position of the fastener to an uninstalled position of the fastener. In an embodiment, the gripping means includes a plurality of serrations adapted to receive a fastener tool. In an embodiment, the gripping means includes a plurality of faces adapted to receive a fastener tool. In an embodiment, the lock portion of the pin member includes an annular stop located at one end thereof and adjacent to the head. In an embodiment, the pin member includes a head located at the second end of the elongated shank portion and adjacent to the pull portion. In an embodiment, the head includes gripping means adapted to facilitate the gripping and rotation of the fastener from an uninstalled position of the fastener to an installed position of the fastener. In an embodiment, the gripping means includes a plurality of serrations adapted to receive a fastener tool. In an embodiment, the gripping means includes a plurality of faces adapted to receive a fastener tool.

In an embodiment, a fastener includes a pin member including a threaded portion having a thread, a pull portion having at least one pull groove, and a breakneck groove located intermediate the threaded portion and the pull portion; and a swage collar adapted to be swaged into the thread of the threaded portion of the pin member.

In an embodiment, the fastener is adapted to secure at least first and second workpieces to one another, wherein the first workpiece includes a hole extending from a first side thereof to a second side thereof opposite the first side and is sized and shaped to receive the pin member, and wherein the second workpiece includes a threaded hole extending within a first side thereof, the threaded hole being sized and shaped and adapted to receive threadedly the thread of the threaded portion of the pin member when the pin member is in an installed position. In an embodiment, a portion of the threaded portion of the pin member protrudes from the first side of the first workpiece and the collar is adapted to be positioned on the threaded portion of the pin member and adjacent to the first side of the first workpiece when the pin member is in its installed position. In an embodiment, the pull portion is adapted to break off from the pin member at the breakneck groove. In an embodiment, a length of the portion of the threaded portion of the pin member protrudes from one end of the collar when the fastener is in an installed position.

In an embodiment, a fastener includes a pin member including a threaded portion having a thread, and a lock portion having at least one lock groove, wherein a length of the lock portion of the pin member is greater than a length of the threaded portion of the pin member; and a swage collar adapted to be swaged into the at least one lock groove of the lock portion of the pin member, wherein the fastener is adapted to secure at least first and second workpieces to one another, wherein the first workpiece includes a hole extending from a first side thereof to a second side thereof opposite the first side, and wherein the second workpiece includes a threaded hole extending within a first side thereof, the threaded hole being adapted to receive threadedly the thread of the threaded portion of the pin member when the pin member is in an installed position. In an embodiment, a portion of the lock portion of the pin member protrudes from the first side of the first workpiece and the collar is adapted to be positioned on the lock portion of the pin member and adjacent to the first side of the first workpiece when the pin member is in its installed position. In an embodiment, the at least one lock groove of the lock portion of the pin member includes a plurality of lock grooves. In an embodiment, the plurality of lock grooves are annular grooves.

In an embodiment, the fastener may be used in aerospace applications. In an embodiment, the fastener may be used for space vehicles. In other embodiments, the fastener may be used for satellite panels. In other embodiments, the fastener may be used for any other appropriate application requiring a fastener.

BEST MODE FOR CARRYING OUT THE INVENTION

Figure 1:
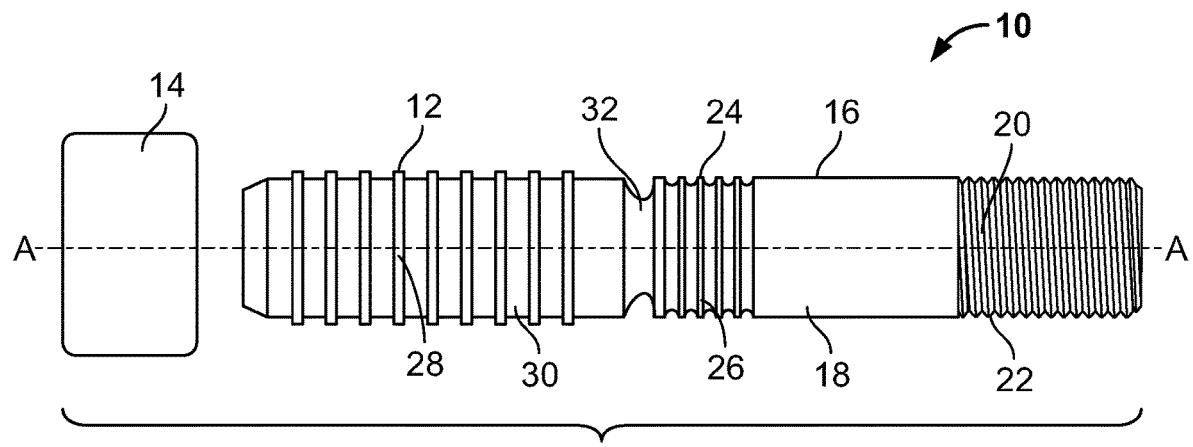
FIG. 1 is a side elevational view of a fastener in accordance with an embodiment.

Referring to FIG. 1, in an embodiment, a fastener 10 includes a pin member (or stud) 12 and a swage collar 14 that is sized and shaped to mate with and be swaged onto the pin member 12. In an embodiment, the pin member 12 includes an elongated shank portion 16. In an embodiment, the shank portion 16 includes a smooth cylindrical shank portion 18, a threaded portion 20 located adjacent to one end of the smooth cylindrical shank portion 18 and having a thread 22, and a lock portion 24 located adjacent to an opposite end of the smooth cylindrical shank portion 18 and having a plurality of lock grooves 26. In an embodiment, the lock grooves 26 are annular grooves. In an embodiment, the threaded portion 20 includes a single thread 22. In another embodiment, the lock portion 24 includes at least one lock groove 26. In another embodiment, the lock portion 24 includes a single lock grove 26. In an embodiment, the shank portion 16 includes a pull portion (pintail portion) 28 having a plurality of pull grooves 30. In an embodiment, the pull grooves 30 are helical grooves. In another embodiment, the pull grooves 30 are annular grooves. In an embodiment, the pull grooves 30 are formed perpendicular to a longitudinal axis A-A of the pin member 12. In another embodiment, the pull grooves 30 are formed obliquely to the longitudinal axis A-A of the pin member 12. In an embodiment, the pull grooves 30 are formed obliquely to the longitudinal axis A-A of the pin member 12 and in an angular direction opposite to that of the thread 22 of the threaded portion 20. In an embodiment, the pull grooves 30 are formed obliquely to the longitudinal axis A-A of the pin member 12 and in an angular direction the same or substantially the same as that of the thread 22 of the threaded portion 20. In another embodiment, the pull portion 28 includes at least one pull groove 30. In another embodiment, the pull portion 28 includes a single pull groove 30. In an embodiment, a breakneck groove 32 is formed between the lock portion 24 of the shank portion 16 and the pull portion 28.

In an embodiment, the pin member 12 is made from medium carbon alloy steel. In an embodiment, the pin member 12 is a Class 10.9 strength level bolt. In other embodiments, the pin member 12 can be characterized by any grade known in the art, such as, for example, Grade 2, Grade 5, Grade 8, Class 8.8, and Class 10.9. In another embodiment, the pin member 12 is made from titanium. In other embodiments, the pin member 12 may be made from other suitable materials known in the art.

In an embodiment, the swage collar 14 is made of aluminum. In another embodiment, the swage collar 14 is made of a titanium alloy. In another embodiment, the swage collar 14 is made of Monel. In another embodiment, the swage collar 14 is made of low carbon steel. In another embodiment, the swage collar 14 is made from unannealed low carbon steel. In another embodiment, the swage collar 14 is made from annealed low carbon steel. In another embodiment, the swage collar 14 is made from medium carbon steel. In another embodiment, the swage collar 14 is made from medium carbon steel that has been thermally processed. In another embodiment, the swage collar 14 is "as-headed" and does not require thermal processing. As employed herein, the term "as-headed" refers to a collar which is strain hardened, for example, from cold working, rather than changing hardness using a thermal process (e.g., quench and tempering; stress relieving; etc.). In another embodiment, the swage collar 14 is thermally processed. In an embodiment, the thermal processing of the swage collar 14 includes quench and tempering. In an embodiment, the thermal processing of the swage collar 14 includes stress relieving. In an embodiment, the collar 14 can be made from other suitable materials known in the art.

Figure 1A:
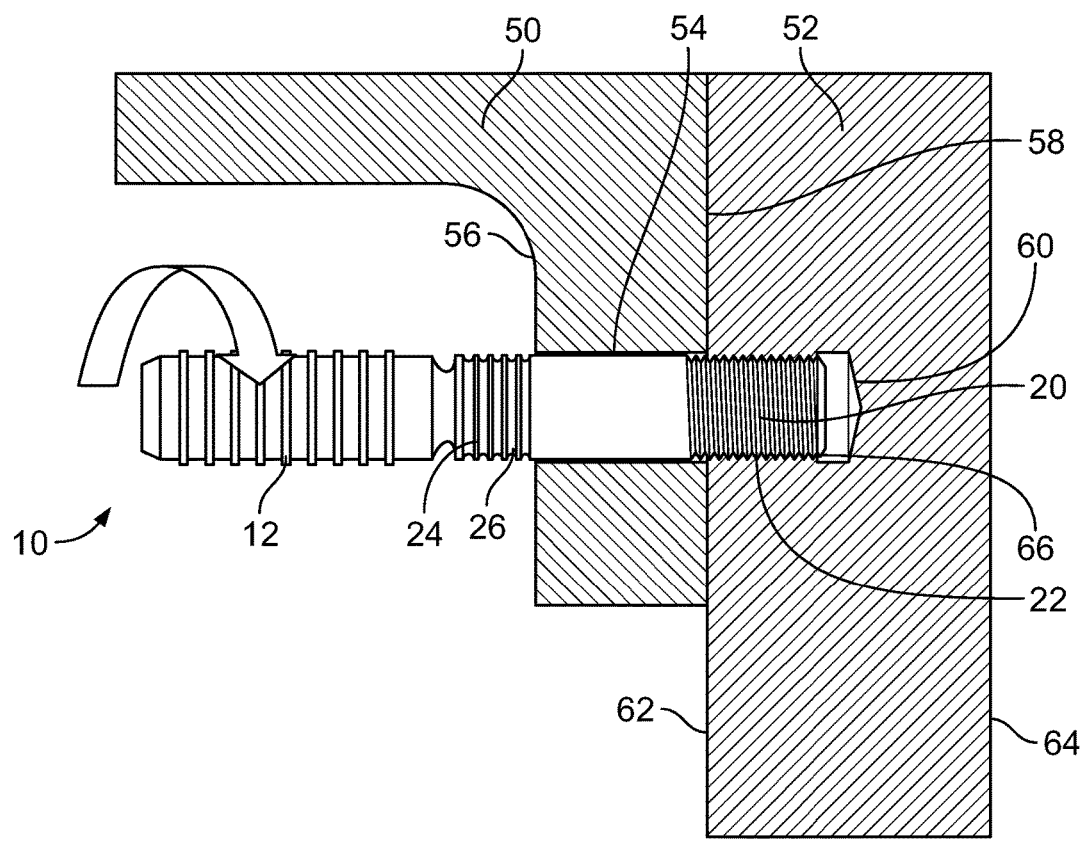
FIG. 1A is a side elevational view of the fastener shown in FIG. 1 with a pin member employed by the fastener preinstalled within a plurality of workpieces which are shown in cross-section.
Figure 1B:
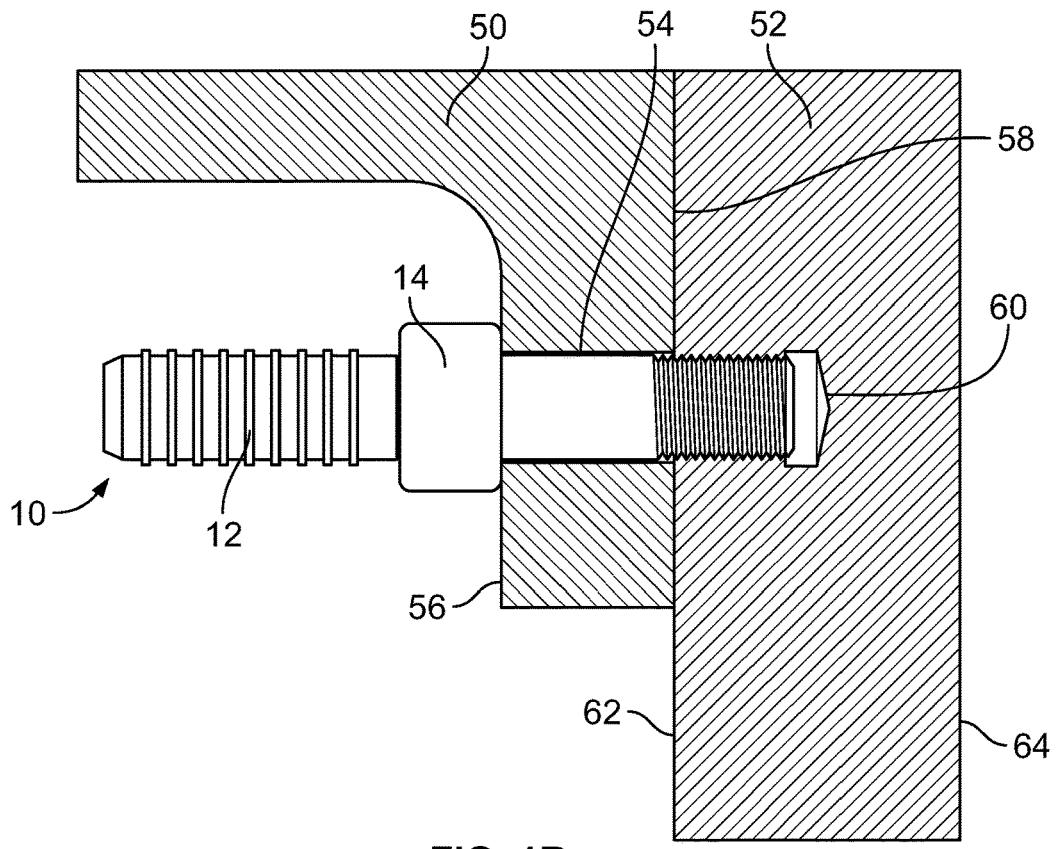
FIG. 1B is a side elevational view of the fastener shown in FIG. 1A installed within the plurality of work pieces and with a collar employed by the fastener installed on the pin member.
Figure 1C:
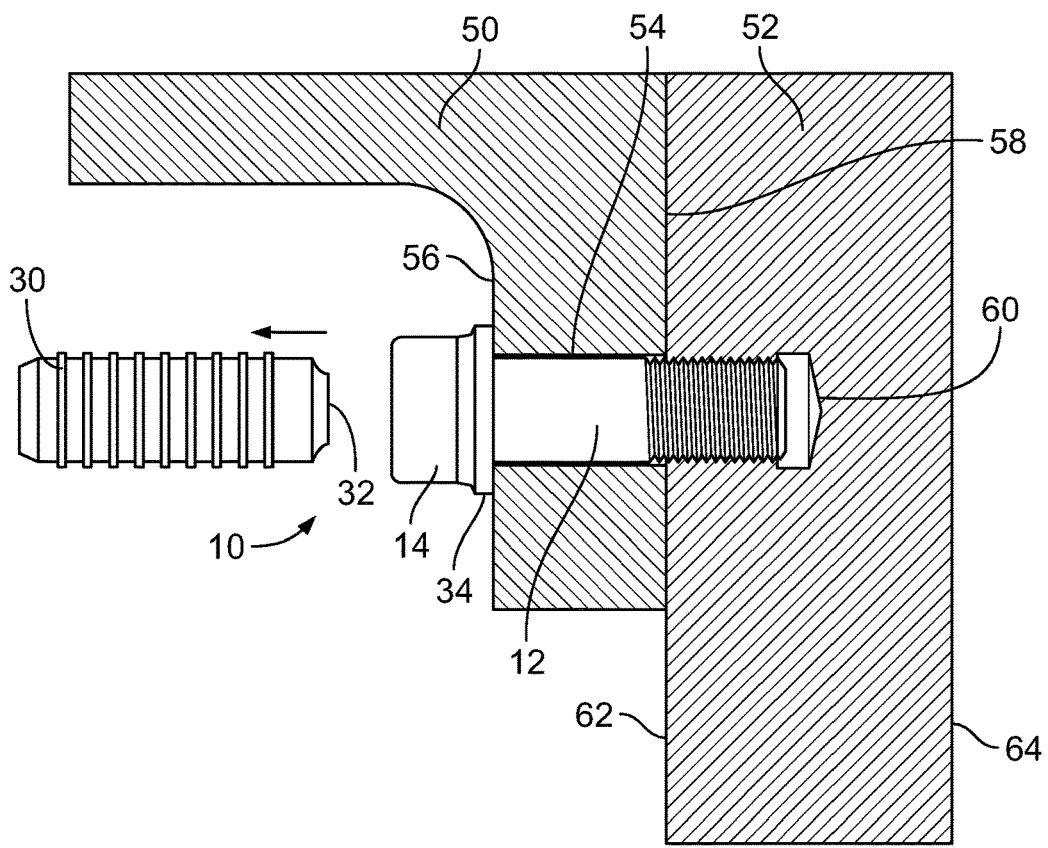
FIG. 1C is a side elevational view of the fastener shown in FIG. 1B, but with the collar swaged on the pin member and a pintail portion of the pin member removed therefrom.

Referring to FIGS. 1A through 1C, the fastener 10 is adapted to secure a plurality of work pieces 50, 52 to one another. In an embodiment, the work piece 50 includes a hole 54 extending from one side 56 therefrom to an opposite side 58 therefrom, while the work piece 52 includes a hole 60 extending from one side 62 therefrom to a location intermediate the side 62 and an opposite side 64 therefrom. In an embodiment, the hole 60 of the work piece 52 is a tapped hole. In an embodiment, the holes 54, 60 are aligned with one another. In an embodiment, the hole 60 of the work piece 52 includes an internal thread 66. In an embodiment, the internal thread 66 is sized and shaped to engage threadedly the thread 22 of the threaded portion 20 of the pin member 12, as described hereinafter. In an embodiment, the work pieces 50, 52 are panels. In an embodiment, the work pieces 50, 52 may be other structural components.

Referring to FIG. 1A, the pin member 12 is installed within the work pieces 50, 52 by inserting it into the respective holes 54, 60 thereof, and rotating it therein manually and/or by an appropriate tool, whereby the thread 22 of the threaded portion 20 of the pin member 12 engages threadedly the internal thread 66 of the hole 60 until the pin member 12 is tightened therein. In an embodiment, when the pin member 12 is installed within the work pieces 50, 52, the lock portion 24 and the corresponding lock grooves 26 protrude from the side 56 of the work piece 50. Referring to FIG. 1B, the collar 14 is installed on the pin member 12, particularly over the lock portion 24, and is positioned adjacent to and abuts the side 56 of the work piece 50. In an embodiment, the collar 14 includes a width that is equal to or greater than the width of the lock portion 24. Referring to FIG. 1C, the fastener 10 is engaged by a fastener installation tool (not shown in the Figures), whereby the pull grooves 30 of the pull portion 28 of the pin member 12 are adapted to be gripped by matching teeth of chuck jaws (collet) of a fastener installation tool having a swage anvil (not shown in the Figures) and apply a relative axial force thereon. In an embodiment, the swage anvil of the tool is adapted to engage the swage collar 14 and apply a relative axial force between the collar 14 and the pin member 12, and to move over the collar 14 and swage it into the lock grooves 26 of the lock portion 24 of the pin member 12 (not shown in the Figures), whereby a flange 34 is formed on one end of the collar 14 and abuts the side 56 of the work piece 50. When the fastener 10 is installed, the pull portion 28 breaks off from the pin member 12 at the breakneck groove 32, providing a visual indication that the fastener 10 has been installed. In an embodiment, the pull portion 28 breaks off in such a manner that the remainder of the breakneck groove 32 on the pin member 12 lies flush or substantially flush with the exposed end of the collar 14.

Figure 2:
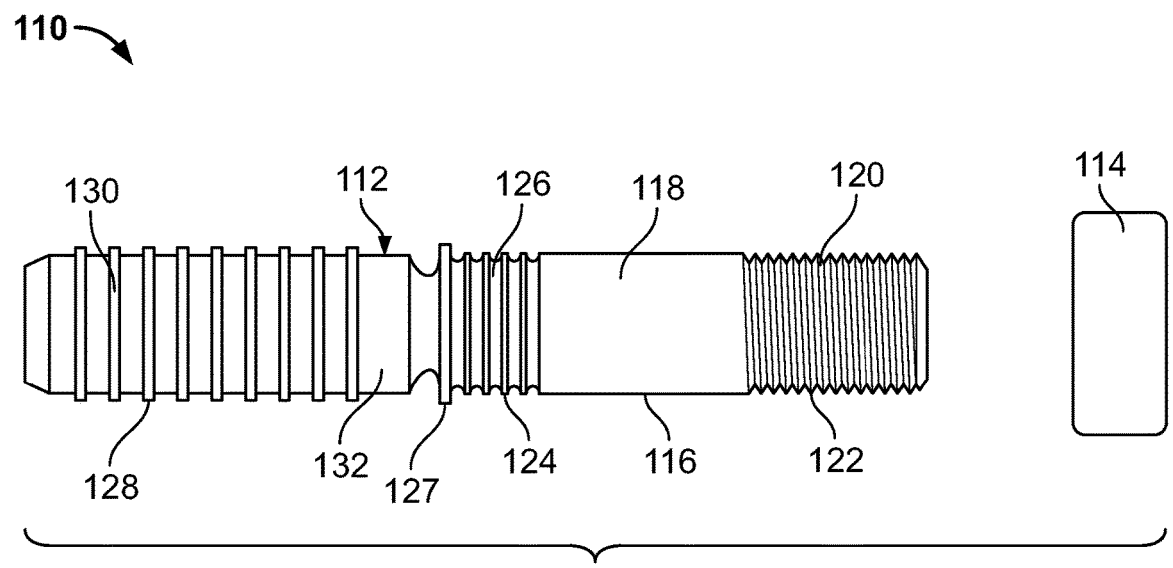
FIGS. 2 through 2C show a fastener in accordance with another embodiment, and its installation within a plurality of workpieces.
Figure 2A:
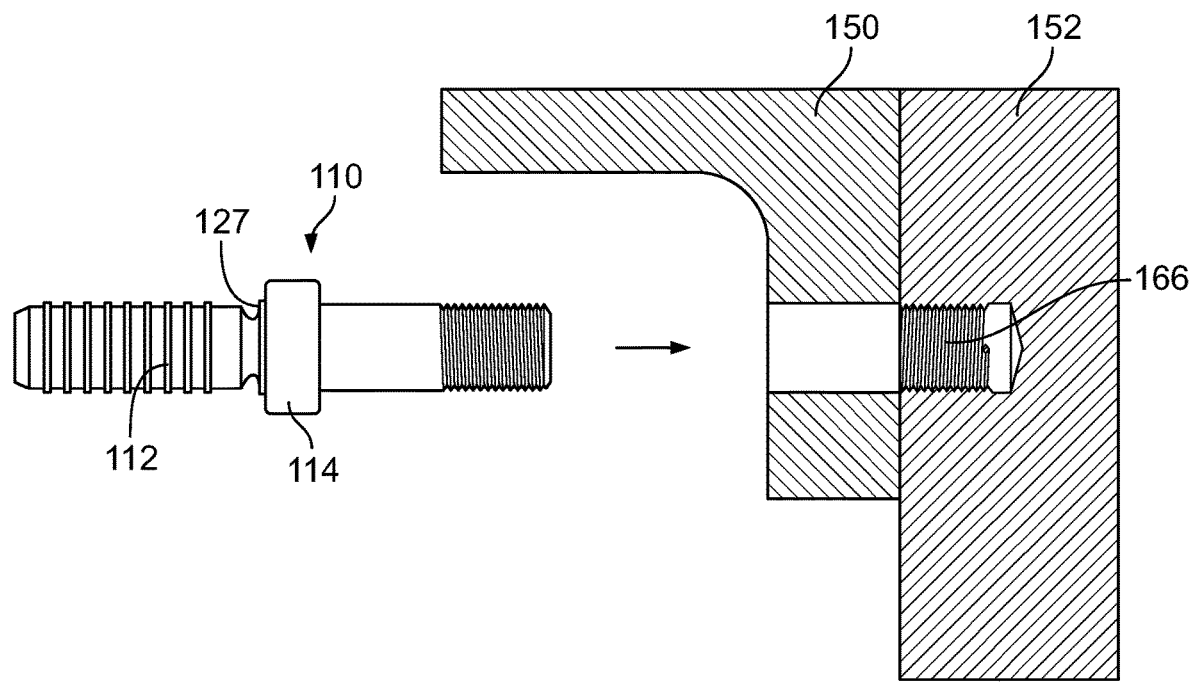
Figure 2B:
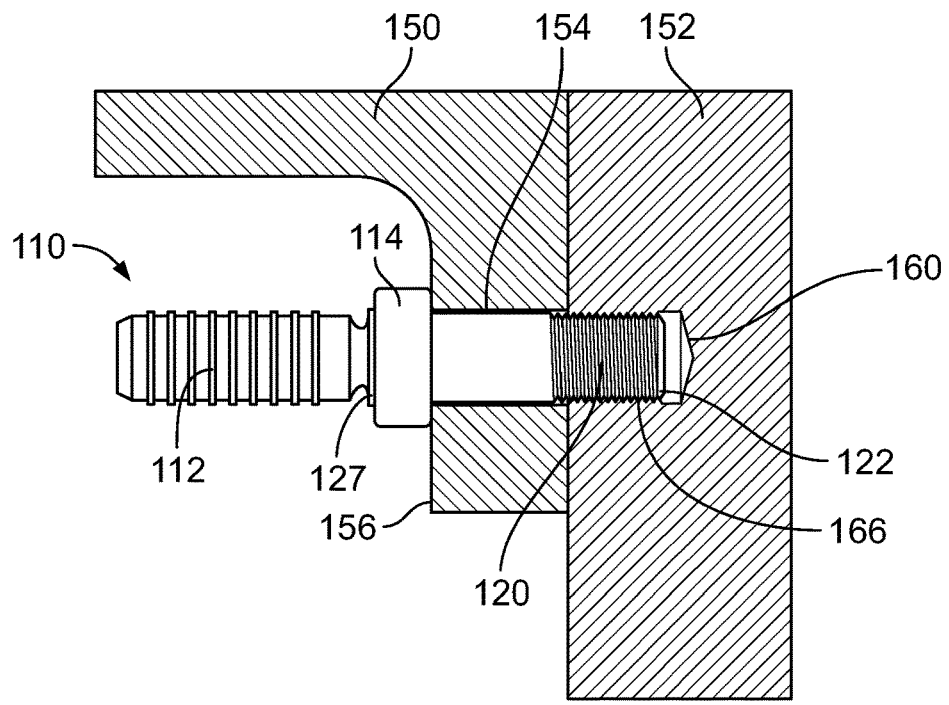
Figure 2C:
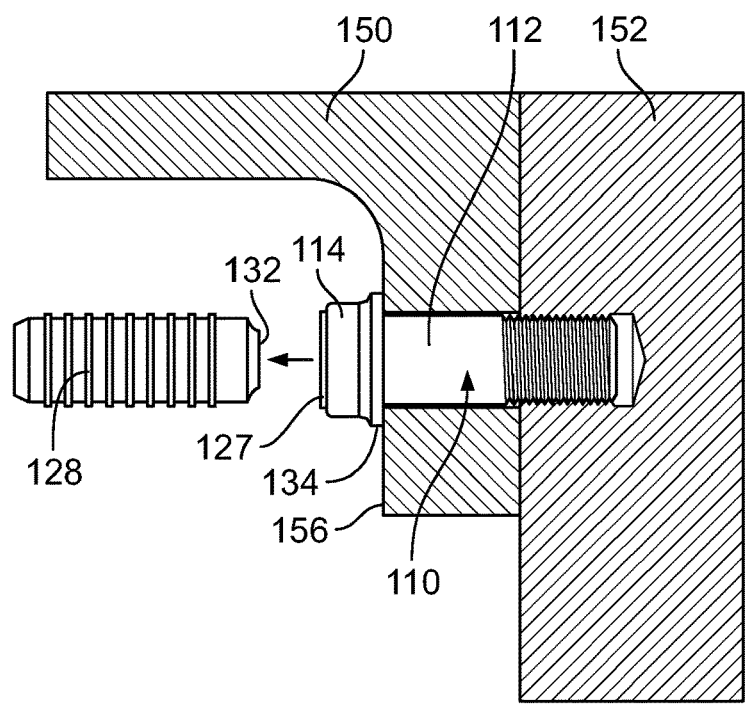

FIGS. 2 through 2C show another embodiment of a fastener 110. Elements shown in FIGS. 2 through 2C which correspond, either identically or substantially, to the elements described above with respect to the embodiment shown in FIGS. 1 through 1C have been designated by corresponding reference numerals increased by one hundred, respectively. Unless otherwise stated, the embodiment shown in FIGS. 2 through 2C is structured and functions in the same manner as the embodiment shown in FIGS. 1 through 1C.

Referring to FIG. 2, in an embodiment, a fastener 110 includes a pin member (or stud) 112 and a swage collar 114 that is sized and shaped to mate with and be swaged onto the pin member 112. In an embodiment, the pin member 112 includes an elongated shank portion 116 having a smooth cylindrical shank portion 118, a threaded portion 120 located adjacent to one end of the smooth cylindrical shank portion 118 and having a thread 122, and a lock portion 124 located adjacent to an opposite end of the smooth cylindrical shank portion 118 and having a plurality of lock grooves 126. In an embodiment, the shank portion 116 includes a pull portion (pintail portion) 128 having a plurality of pull grooves 130. In an embodiment, the lock portion 124 includes an annular stop 127 located at one end thereof proximate to the pull portion 128. In an embodiment, a breakneck groove 132 is formed intermediate the annular stop 127 of the lock portion 124 of the shank portion 116 and the pull portion 128. In an embodiment, the annular stop 127 includes an outer diameter that is greater than an outer diameter of the remainder of the features of the elongated shank portion 116.

Referring to FIGS. 2A through 2C, the fastener 110 is adapted to secure a plurality of work pieces 150, 152 to one another. Referring to FIG. 2A, in an embodiment, the collar 114 is installed on the pin member 112 such that the collar is positioned over the lock portion 124 and adjacent to and abuts one side of the annular stop 127. Referring to FIG. 2B, the pin member 112 is installed within the work pieces 150, 152 by inserting it into respective holes 154, 160 thereof, and rotating it therein manually and/or by an appropriate tool, whereby the thread 122 of the threaded portion 120 of the pin member 112 engages threadedly the internal thread 166 of the hole 160 until the pin member 112 is tightened therein. In an embodiment, when the pin member 112 is installed within the work pieces 150, 152, the collar 114, which is positioned on the lock portion 124, protrude from a side 156 of the work piece 150, and the collar 114 is sandwiched between the stop 127 and the side 156 of the work piece 150. As the pin member 112 is tightened within the work pieces 150, 152, the stop 127 maintains the collar 114 in position. Referring to FIG. 2C, the fastener 110 is installed by a fastener installation tool (not shown in the Figures), with the collar 114 being swaged into the lock grooves 126 of the lock portion 124 of the pin member 112 (not shown in the Figures), whereby a flange 134 is formed on one end of the collar 114 and abuts the side 156 of the work piece 150, while an opposite side of the collar 114 remains abutting the stop 127 of the pin member 112. When the fastener 110 is installed, the pull portion 128 breaks off from the pin member 112 at the breakneck groove 132, providing a visual indication that the fastener 110 has been installed. In an embodiment, the pull portion 128 breaks off in such a manner that the remainder of the breakneck groove 132 on the pin member lies flush or substantially flush with the exposed end of the stop 127 of the pin member 112.

Figure 3:
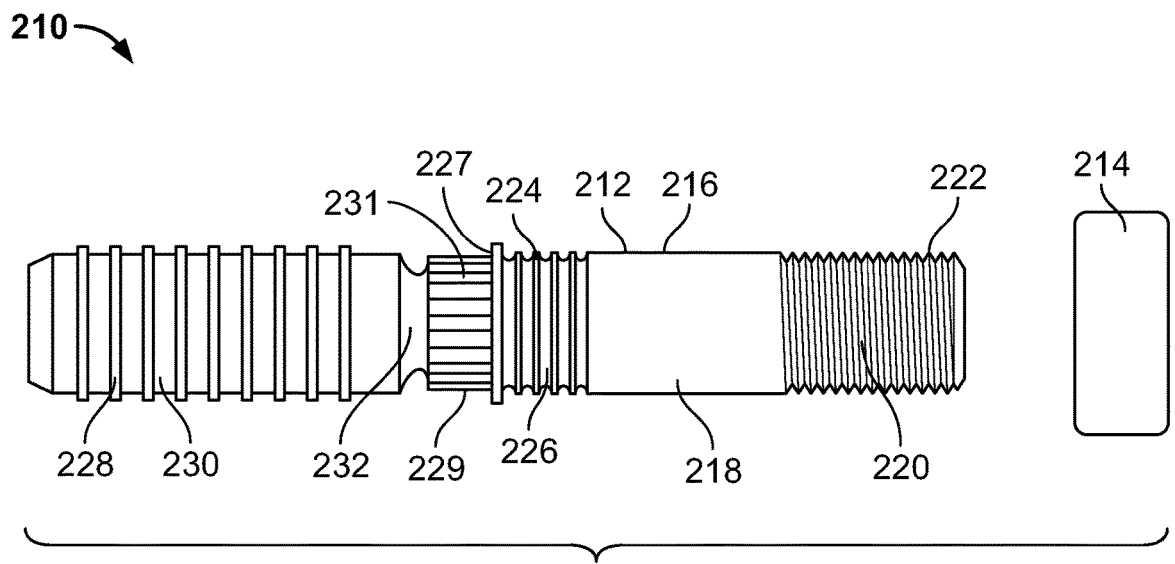
FIGS. 3 through 3D show a fastener in accordance with another embodiment, and its installation within and removal from a plurality of workpieces.
Figure 3A:
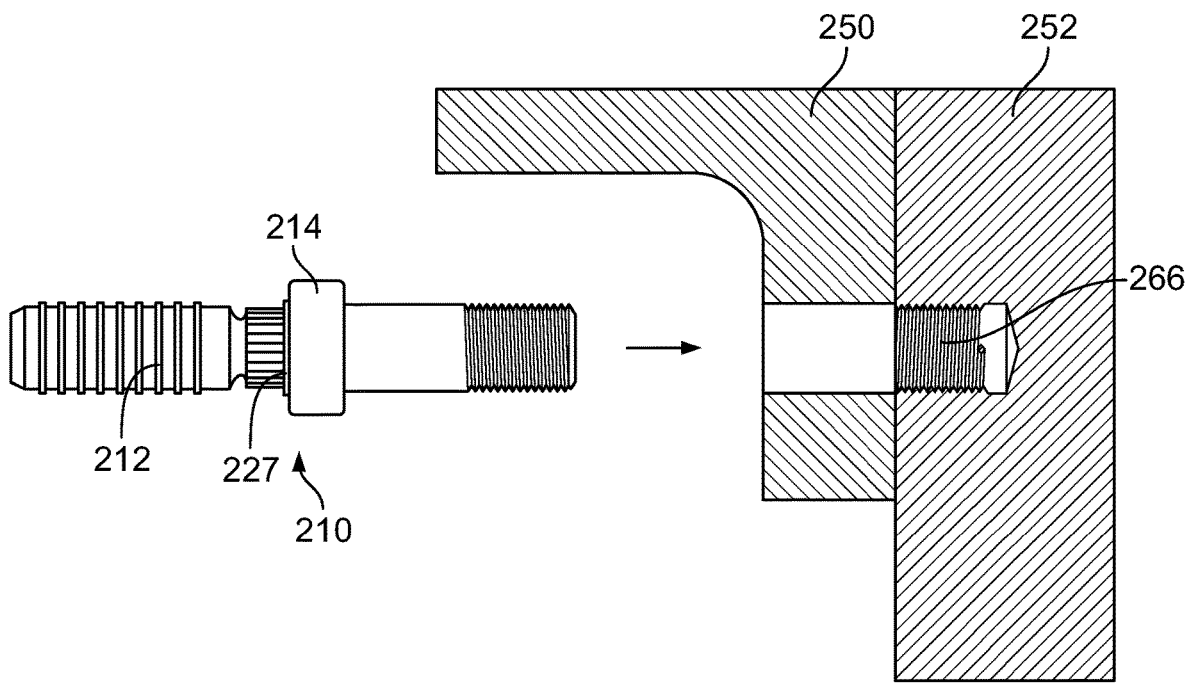
Figure 3B:
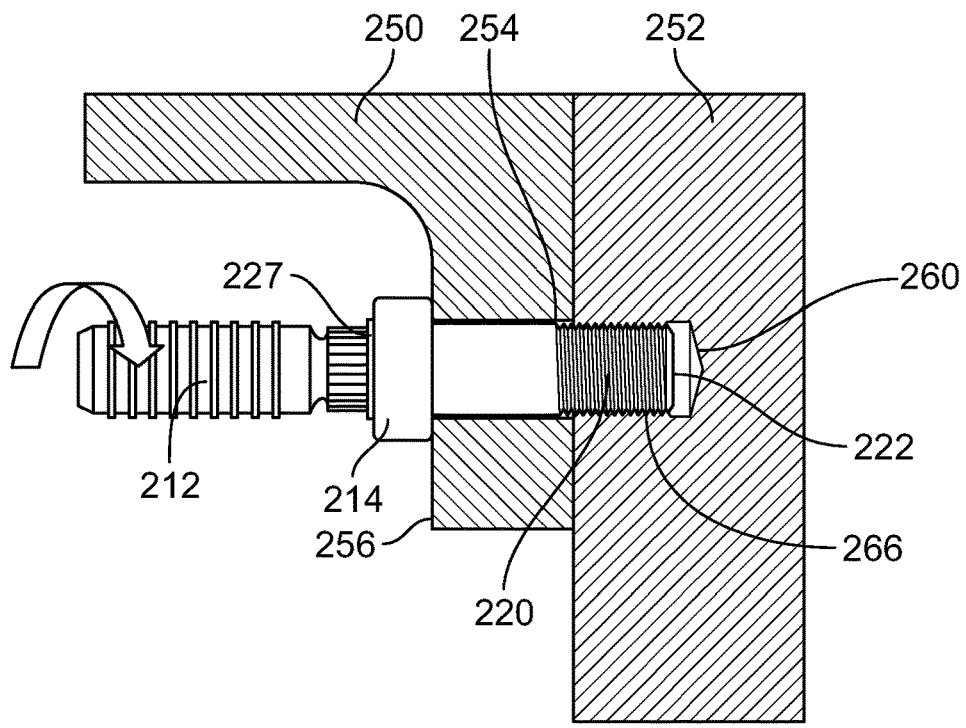
Figure 3C:
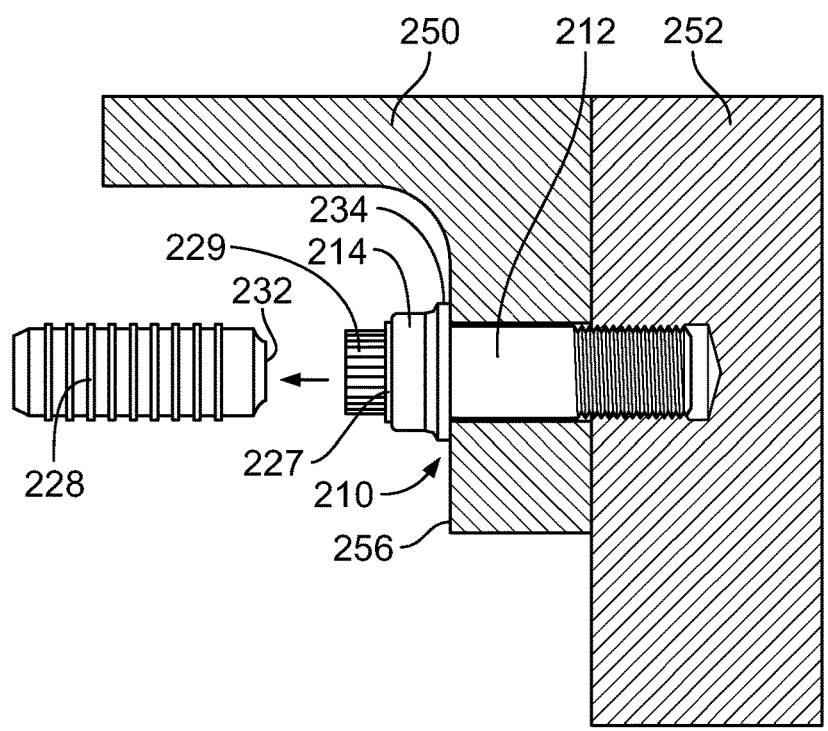
Figure 3D:
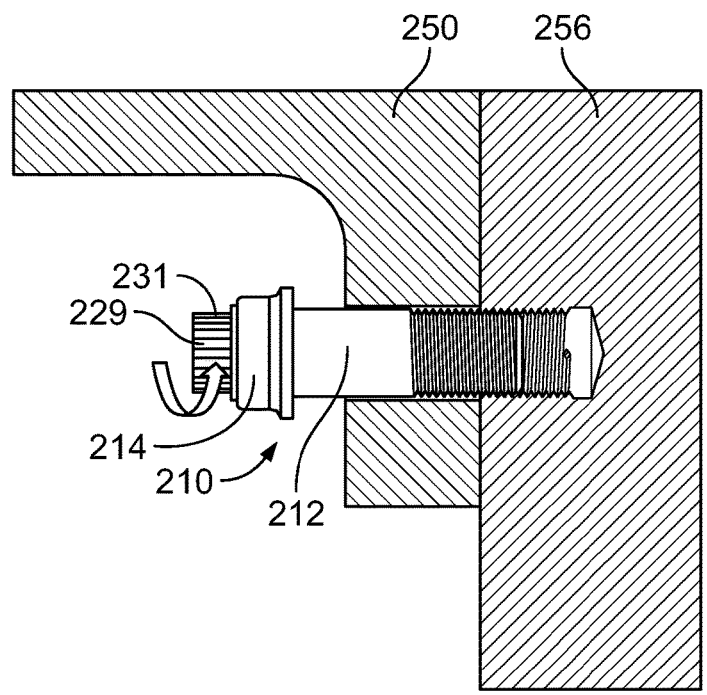

FIGS. 3 through 3D show another embodiment of a fastener 210. Elements shown in FIGS. 3 through 3D which correspond, either identically or substantially, to the elements described above with respect to the embodiment shown in FIGS. 2 through 2C have been designated by corresponding reference numerals increased by one hundred, respectively. Unless otherwise stated, the embodiment shown in FIGS. 3 through 3D is structured and functions in the same manner as the embodiment shown in FIGS. 2 through 2C.

Referring to FIG. 3, in an embodiment, a fastener 210 includes a pin member (or stud) 212 and a swage collar 214 that is sized and shaped to mate with and be swaged onto the pin member 212. In an embodiment, the pin member 212 includes an elongated shank portion 216 having a smooth cylindrical shank portion 218, a threaded portion 220 located adjacent to one end of the smooth cylindrical shank portion 218 and having a thread 222, and a lock portion 224 located adjacent to an opposite end of the cylindrical shank portion 218 and having a plurality of lock grooves 226. In an embodiment, the shank portion 216 includes a pull portion (pintail portion) 228 having a plurality of pull grooves 230. In an embodiment, the lock portion 224 includes an annular stop 227 located at one end thereof and a head 229. In an embodiment, the head 229 includes a plurality of serrations 231 formed circumferentially thereon. In another embodiment, the head 229 includes at least one of the serrations 231. In an embodiment, a breakneck groove 232 is formed intermediate the head 229 of the lock portion 224 of the shank portion 216 and the pull portion 228. In an embodiment, the annular stop 227 includes an outer diameter that is greater than outer diameter of the remainder of the features of the elongated shank portion 216.

Referring to FIGS. 3A through 3D, the fastener 210 is adapted to secure a plurality of work pieces 250, 252 to one another. Referring to FIG. 3A, in an embodiment, the collar 214 is installed on the pin member 212 such that the collar 214 is positioned over the lock portion 224 and adjacent to and abuts one side of the annular stop 227. Referring to FIG. 3B, the pin member 212 is installed within the work pieces 250, 252 by inserting it into respective holes 254, 260 thereof, and rotating it therein manually and/or by an appropriate tool, whereby the thread 222 of the threaded portion 220 of the pin member 212 engages threadedly the internal thread 266 of the hole 260 until the pin member 212 is tightened therein. In an embodiment, when the pin member 212 is installed within the work pieces 250, 252, the collar 214, which is positioned on the lock portion 224, protrudes from a side 256 of the work piece 250, and the collar is sandwiched between the stop 227 and the side 256 of the work piece 250. As the pin member 212 is tightened within the work pieces 250, 252, the stop 227 maintains the collar 214 in position. Referring to FIG. 3C, the fastener 210 is installed by a fastener installation tool (not shown in the Figures), with the collar 214 being swaged into the lock grooves 226 of the lock portion 224 of the pin member 212 (not shown in the Figures), whereby a flange 234 is formed on one end of the collar 214 and abuts the side 256 of the work piece 250, while an opposite side of the collar 214 remains abutting the stop 227 of the pin member 222. When the fastener 210 is installed, the pull portion 228 breaks off from the pin member 212 at the breakneck groove 232, providing a visual indication that the fastener 210 has been installed. In an embodiment, the pull portion 228 breaks off in such a manner that the remainder of the breakneck groove 232 on the pin member lies flush or substantially flush with the exposed end of the head 229 of the pin member 212. Referring to FIG. 3D, the fastener 210 may be uninstalled from the work pieces 250, 256 by rotating it relative thereto by way of the head 229. The serrations 231 of the head 229 facilitate the gripping and rotation of the head 229 and, in turn, the fastener 210. In other embodiments, gripping means other than the serrations 231 may be utilized, such as textured surfaces, knurling, dimpled surfaces, etc.

Figure 4:
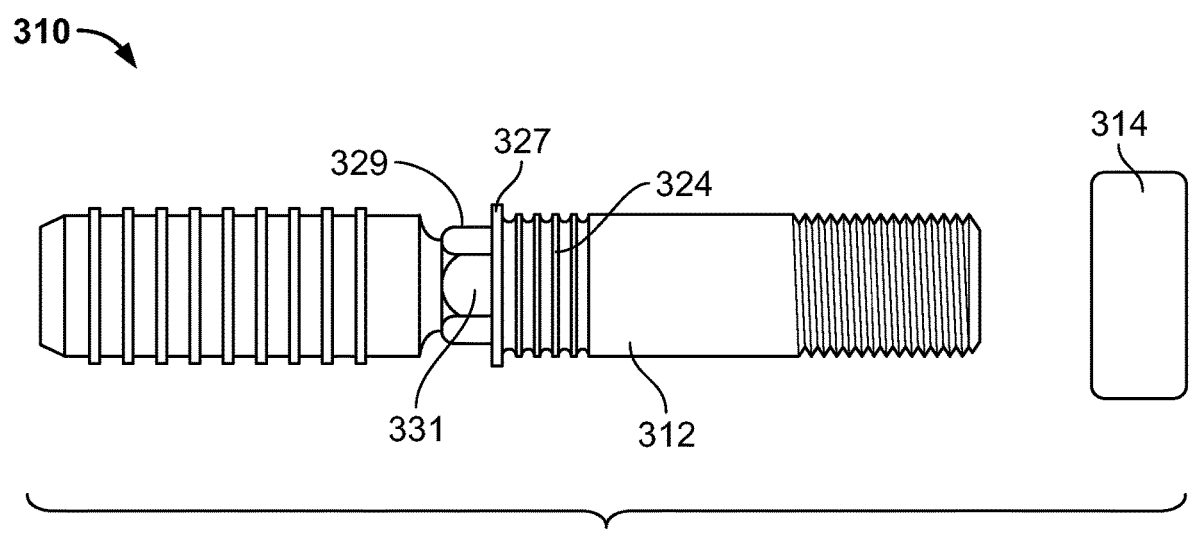
FIGS. 4 through 4D show a fastener in accordance with another embodiment, and its installation within and removal from a plurality of workpieces.
Figure 4A:
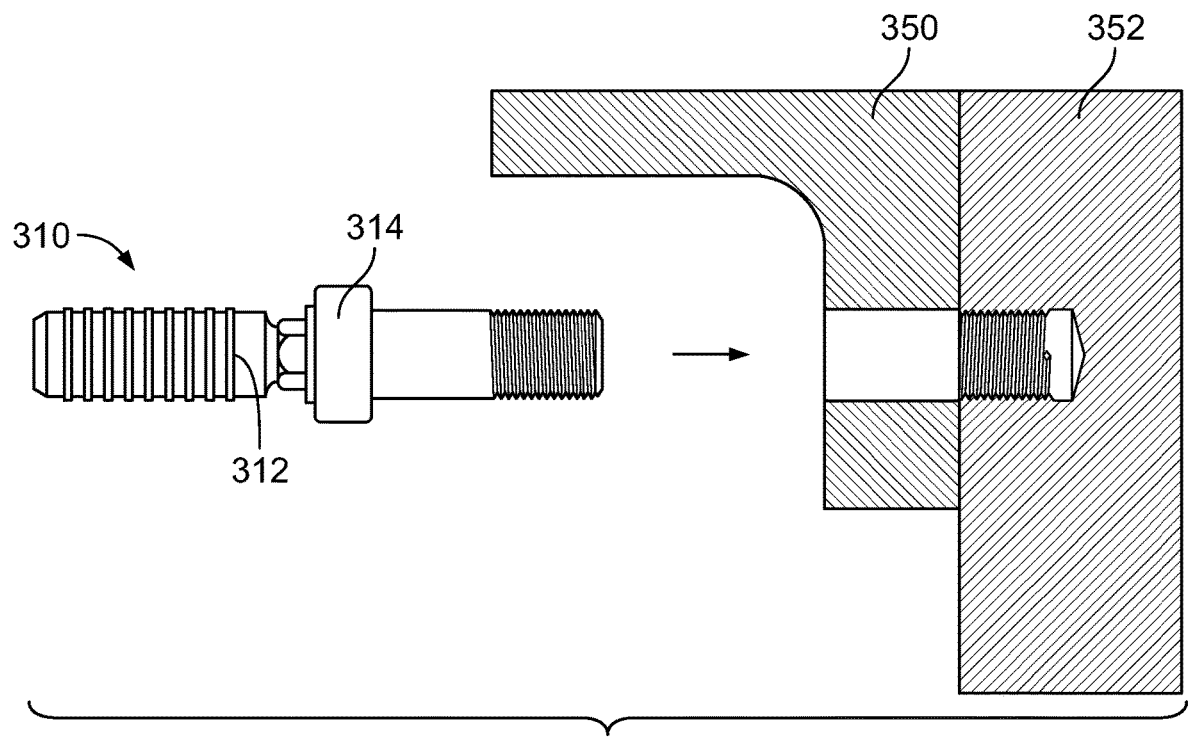
Figure 4B:
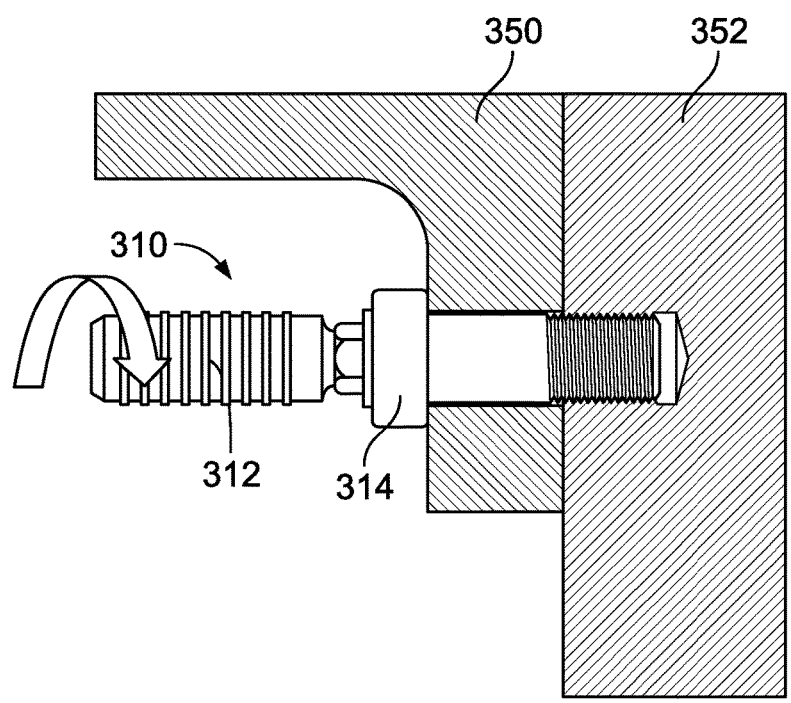
Figure 4C:
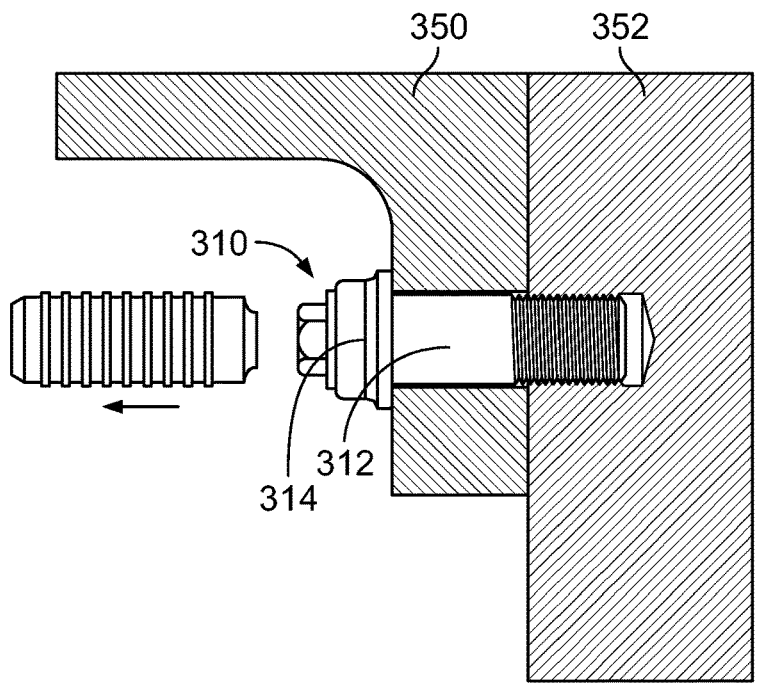
Figure 4D:
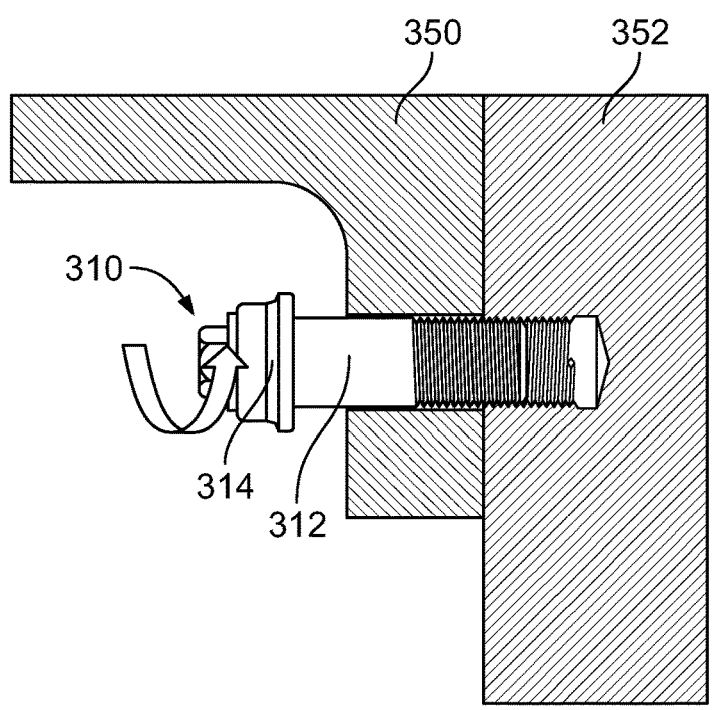

FIGS. 4 through 4D show another embodiment of a fastener 310. Elements shown in FIGS. 4 through 4D which correspond, either identically or substantially, to the elements described above with respect to the embodiment shown in FIGS. 3 through 3D have been designated by corresponding reference numerals increased by one hundred, respectively. Unless otherwise stated, the embodiment shown in FIGS. 4 through 4D is structured and functions in the same manner as the embodiment shown in FIGS. 3 through 3D.

Referring to FIG. 4, in an embodiment, a fastener 310 includes a pin member (or stud) 312 and a swage collar 314 that is sized and shaped to mate with and be swaged onto the pin member 312. For the sake of brevity, the pin member 312 includes a structure and function that is similar to those of the fastener 210, except that it includes a head 329, rather than the serrated head 229, positioned adjacent to an annular stop 327 of a lock portion 324. In an embodiment, the head 329 includes plurality of faces 331 that are adapted to receive an appropriate tool, such as a wrench, for rotating the pin member 312. In an embodiment, the head 329 is a hex head that includes six of the faces 331, as shown in FIG. 4. In other embodiments, the head 329 may include more or less than six of the faces 331, such as four, five, etc. FIGS. 4A through 4D show the installation of the fastener 310 in a plurality of work pieces 350, 352, and its removal therefrom, in a manner similar to that as shown for the fastener 210 in FIGS. 3A through 3D. That is, referring to FIG. 4D, the fastener 310 may be uninstalled from the work pieces 350, 352 by rotating it relative thereto by way of the head 329 with the tool.

Figure 5:
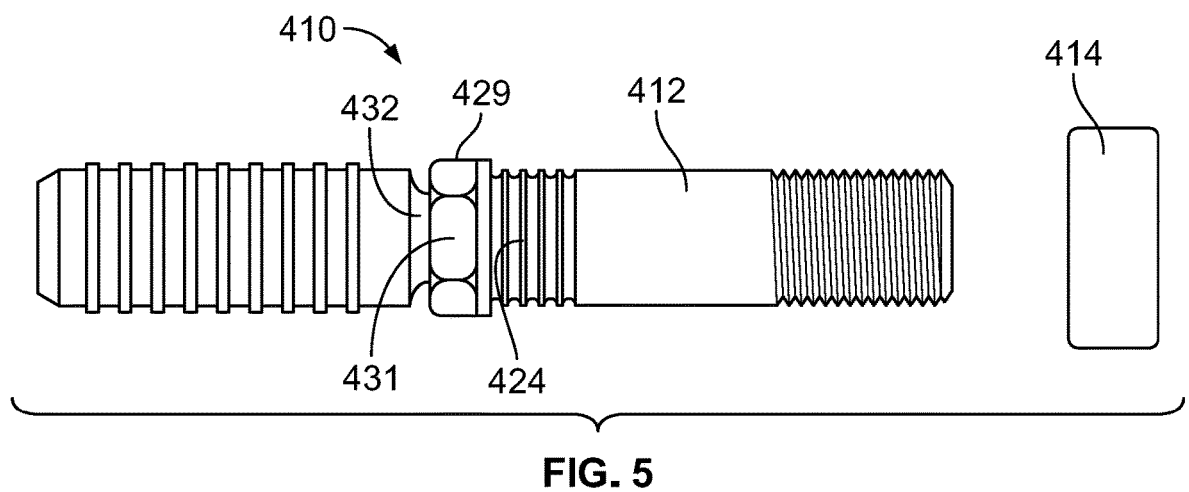
FIGS. 5 through 5D show a fastener in accordance with another embodiment, and its installation within and removal from a plurality of workpieces.
Figure 5A:
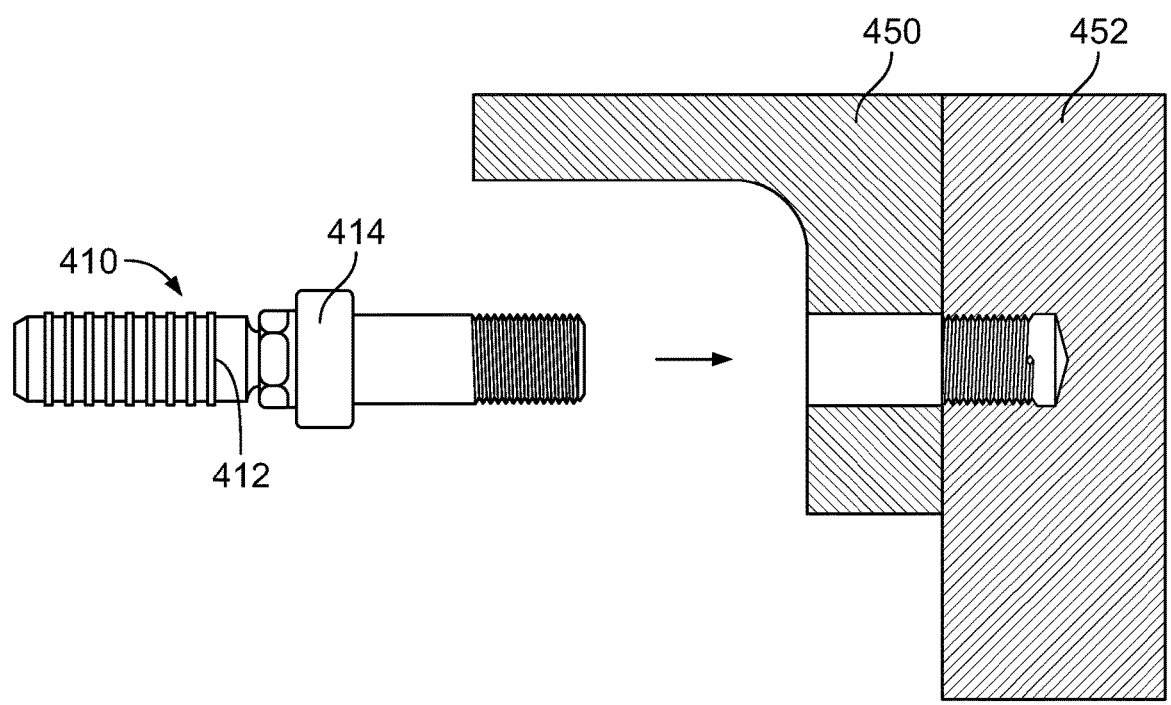
Figure 5B:
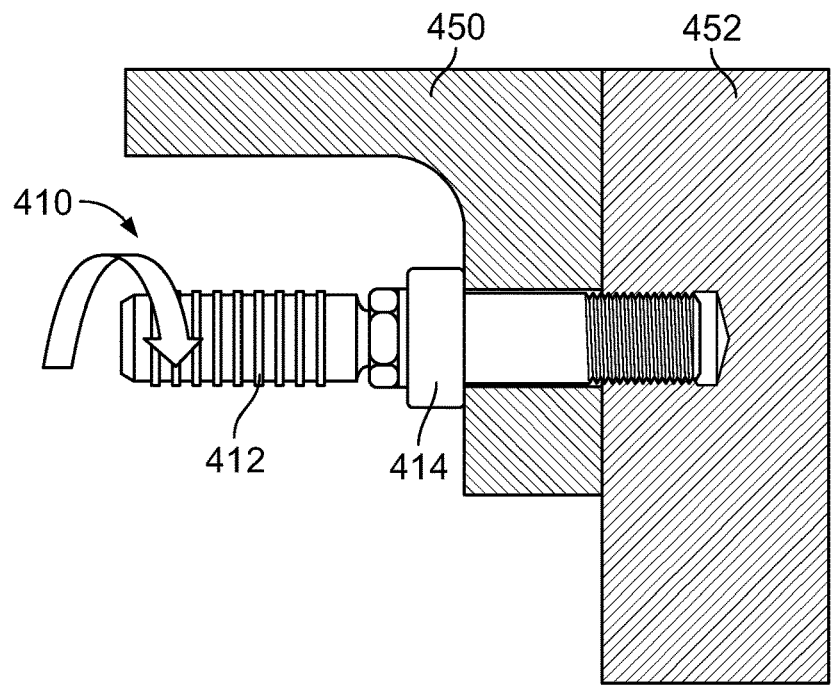
Figure 5C:
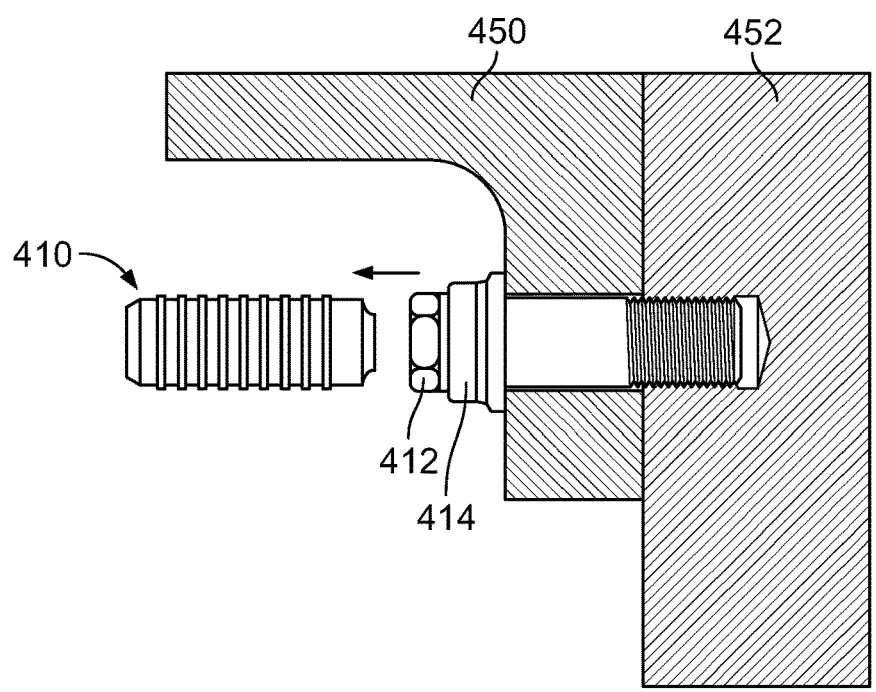
Figure 5D:
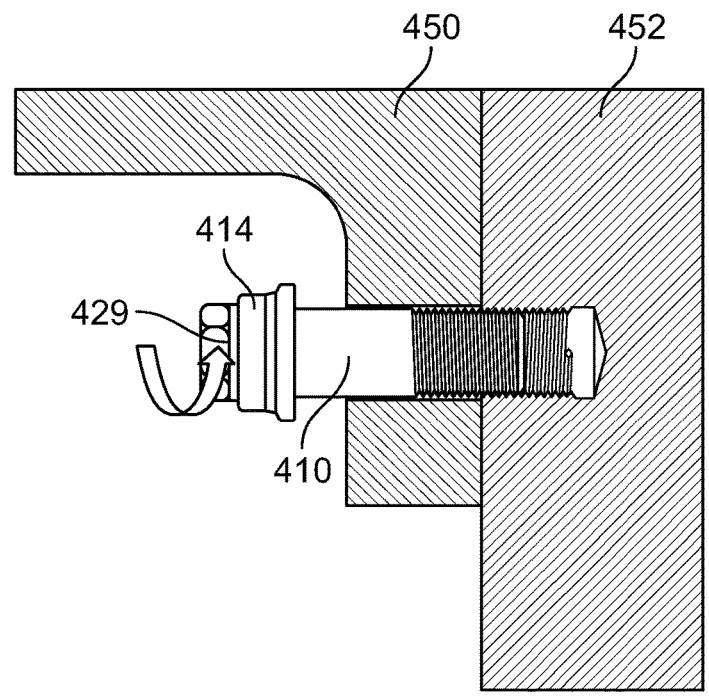

FIGS. 5 through 5D show another embodiment of a fastener 410. Elements shown in FIGS. 5 through 5D which correspond, either identically or substantially, to the elements described above with respect to the embodiment shown in FIGS. 4 through 4D have been designated by corresponding reference numerals increased by one hundred, respectively. Unless otherwise stated, the embodiment shown in FIGS. 5 through 5D is structured and functions in the same manner as the embodiment shown in FIGS. 4 through 4D.

Referring to FIG. 5, in an embodiment, a fastener 410 includes a pin member (or stud) 412 and a swage collar 414 that is sized and shaped to mate with and be swaged onto the pin member 412. For the sake of brevity, the pin member 412 includes a structure and function that is similar to those of the fastener 310, except that it does not include the stop 327. Rather a head 429 is located intermediate a lock portion 424 and a breakneck groove 432. In an embodiment, the head 429 includes plurality of faces 431 that are adapted to receive an appropriate tool, such as a wrench, for rotating the pin member 412. In an embodiment, the head 429 is a hex head that includes six of the faces 431, as shown in FIG. 5. In other embodiments, the head 429 may include more or less than six of the faces 431, such as four, five, etc. FIGS. 5A through 5D show the installation of the fastener 410 in a plurality of work pieces 450, 452, and its removal therefrom, in a manner similar to that as shown for the fastener 310 in FIGS. 4A through 4D. That is, referring to FIG. 5D, the fastener 410 may be uninstalled from the work pieces 450, 452 by rotating it relative thereto by way of the head 429 with the tool.

Figure 6:
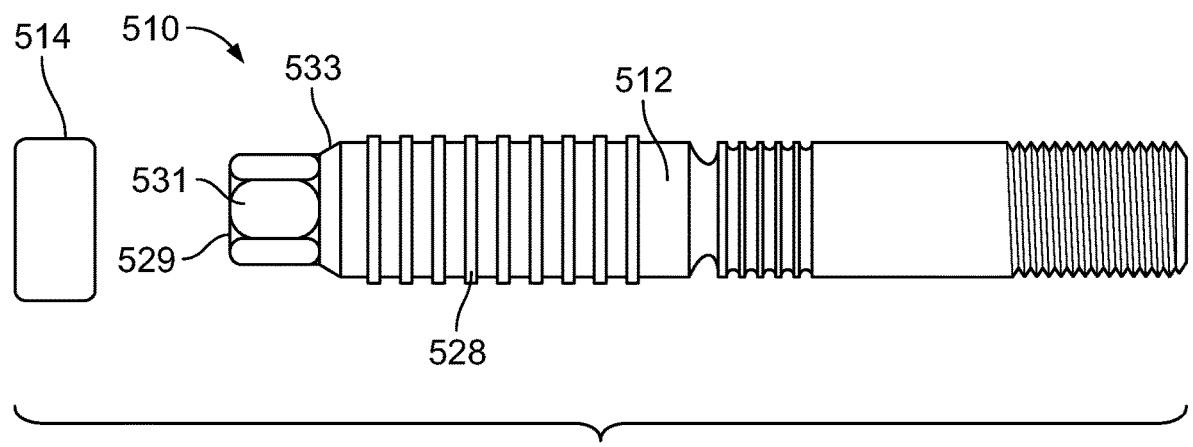
FIGS. 6 through 6C show a fastener in accordance with another embodiment, and its installation within a plurality of workpieces.
Figure 6A:
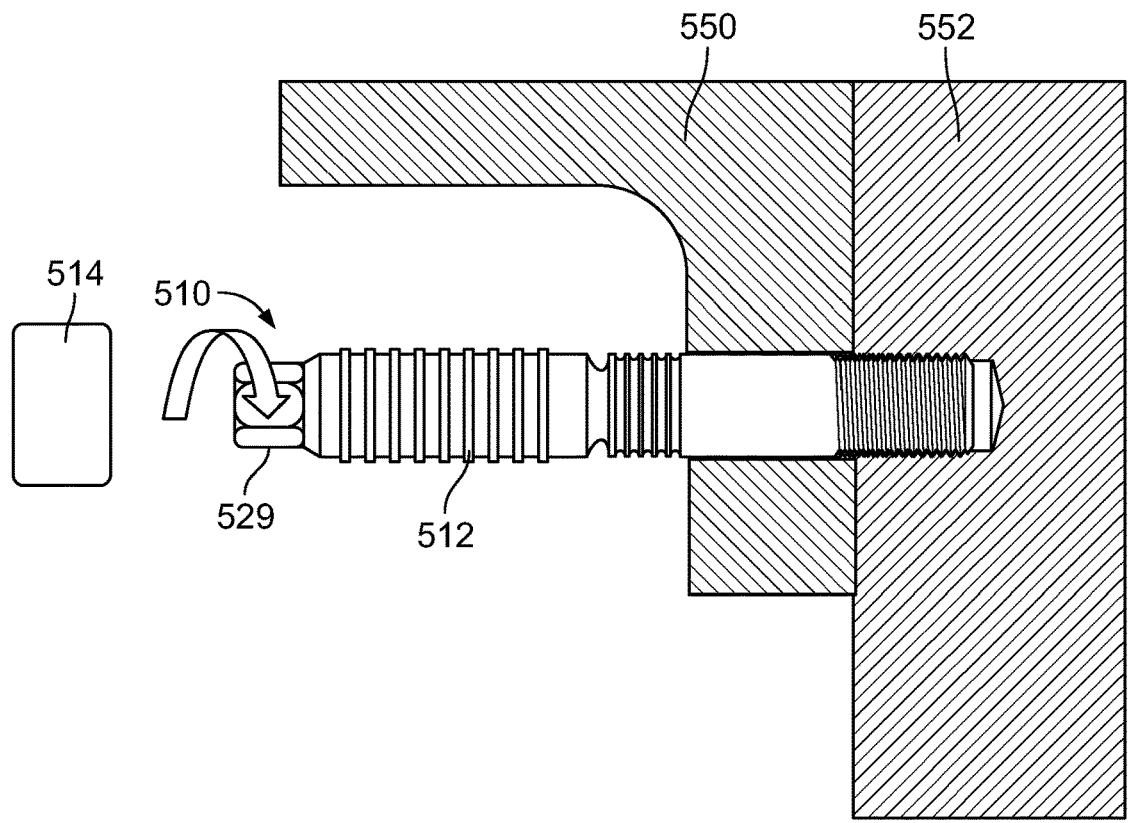
Figure 6B:
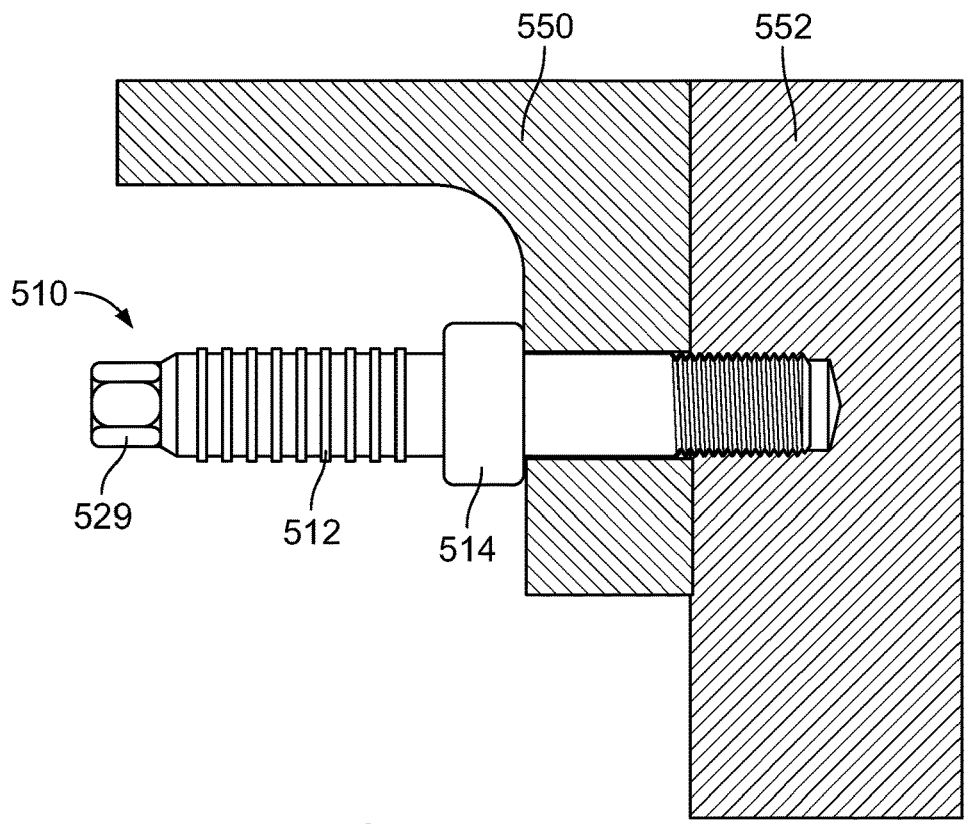
Figure 6C:
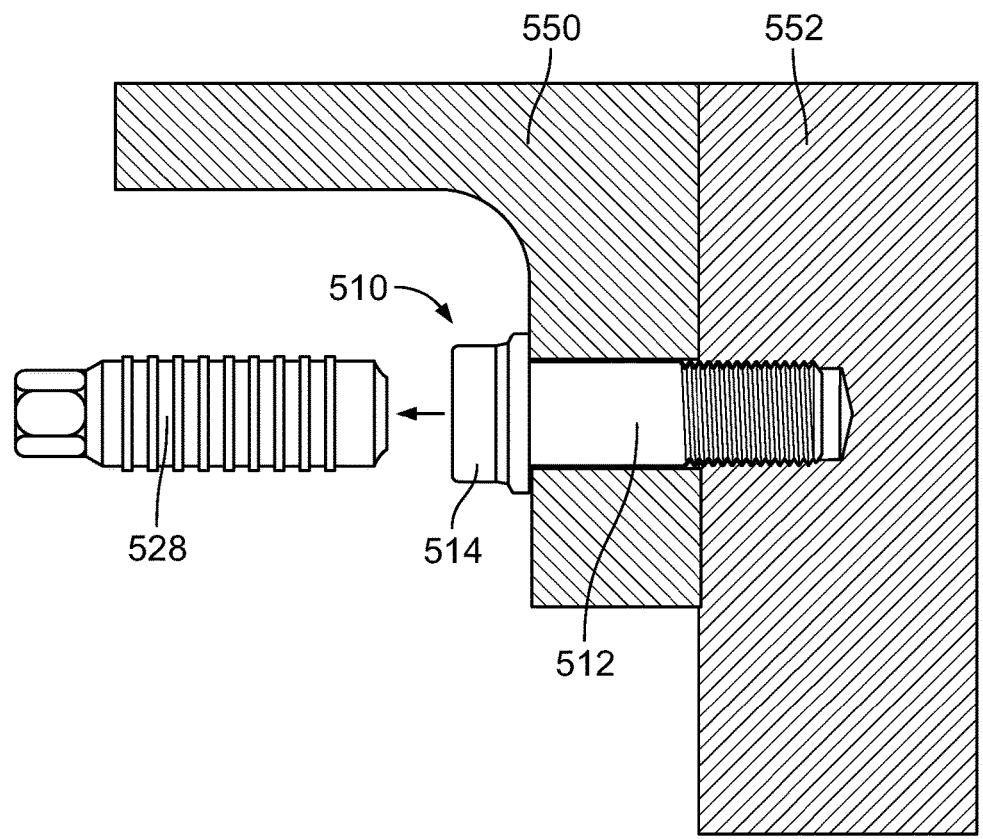

FIGS. 6 through 6C show another embodiment of a fastener 510. Elements shown in FIGS. 6 through 6C which correspond, either identically or substantially, to the elements described above with respect to the embodiment shown in FIGS. 1 through 1C have been designated by corresponding reference numerals increased by five hundred, respectively. Unless otherwise stated, the embodiment shown in FIGS. 6 through 6C is structured and functions in the same manner as the embodiment shown in FIGS. 1 through 1C.

Referring to FIG. 6, in an embodiment, a fastener 510 includes a pin member (or stud) 512 and a swage collar 514 that is sized and shaped to mate with and be swaged onto the pin member 512. For the sake of brevity, the pin member 512 includes a structure and function that is similar to those of the pin member 12, except that a pull portion 528 includes a head 529 located at and extending from a free end 533 thereof. In an embodiment, the head 529 includes a plurality of faces 531 that are adapted to receive an appropriate tool, such as a wrench, for rotating the pin member 512. In an embodiment, the head 529 is a hex head that includes six of the faces 531. In other embodiments, the head 529 may include more or less than six of the faces 531, such as four, five, etc. In other embodiments, other gripping means in addition to or other than the faces 531 may be utilized, such as serrations, textured surfaces, knurling, dimpled surfaces, etc. FIGS. 6A through 6C show the installation of the fastener 510 in a plurality of work pieces 550, 552, and its removal therefrom, in a manner similar to that as shown for the fastener 10 in FIGS. 1A through 1C. That is, referring to FIG. 6A, the fastener 510 may be installed within the work pieces 550, 552 by rotating it relative thereto by way of the head 529 with the tool.

Figure 7:
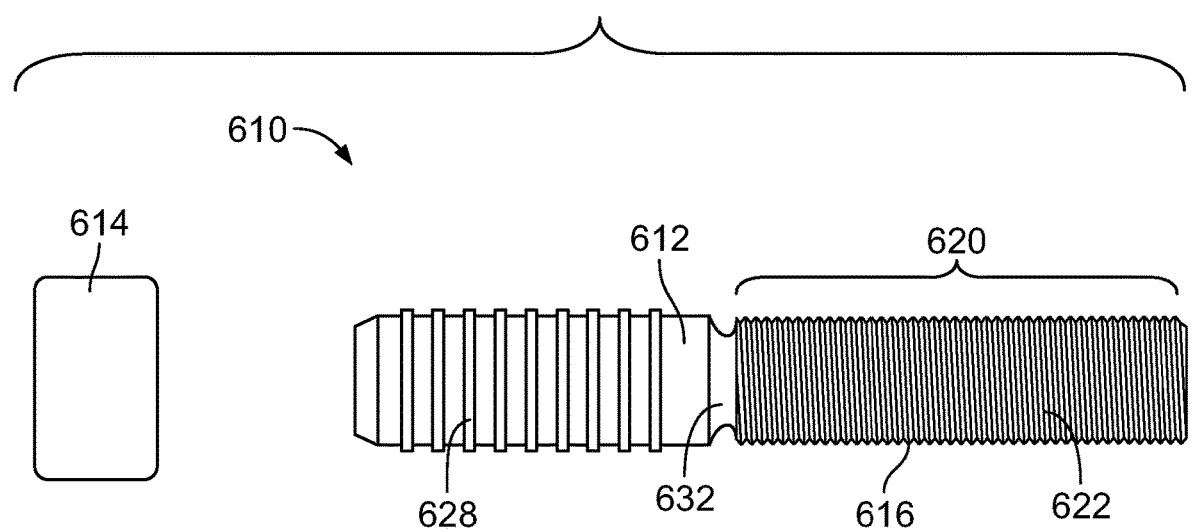
FIGS. 7 through 7C show a fastener in accordance with another embodiment, and its installation within a plurality of workpieces.
Figure 7A:
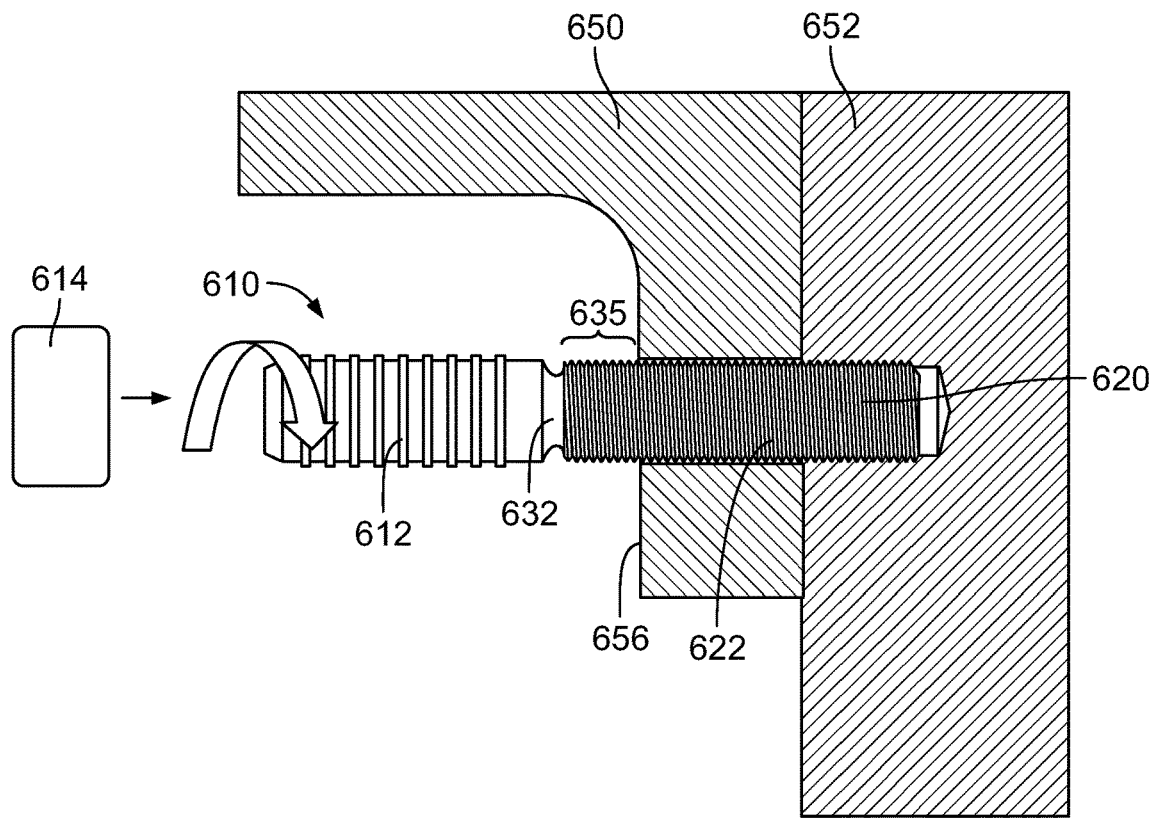
Figure 7B:
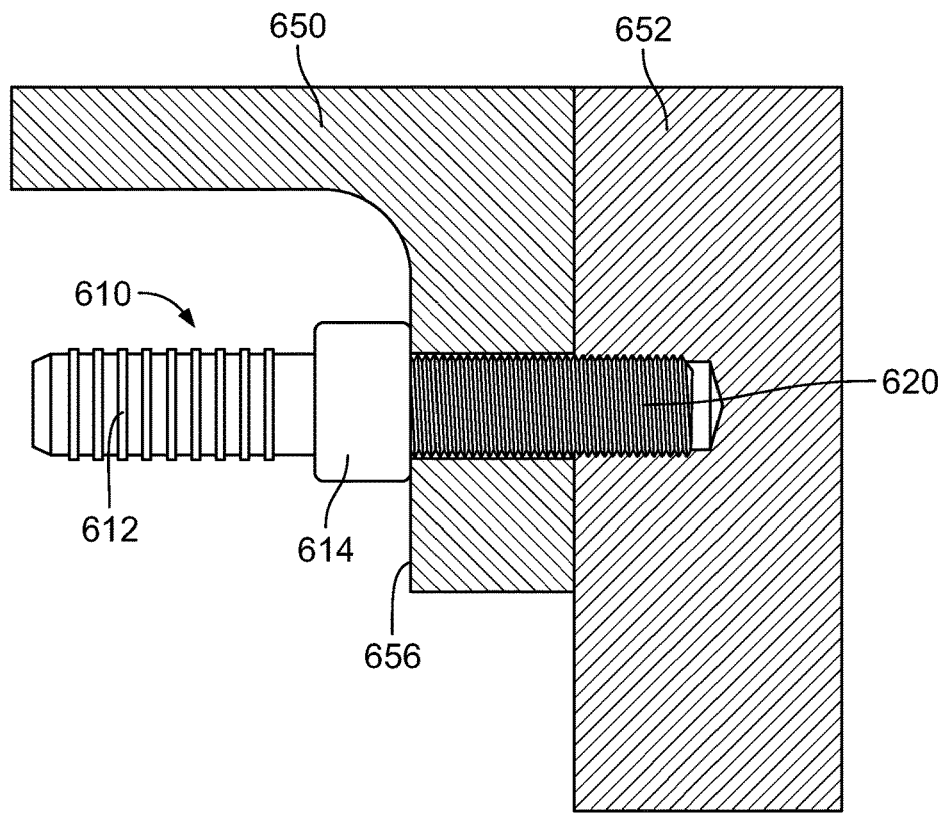
Figure 7C:
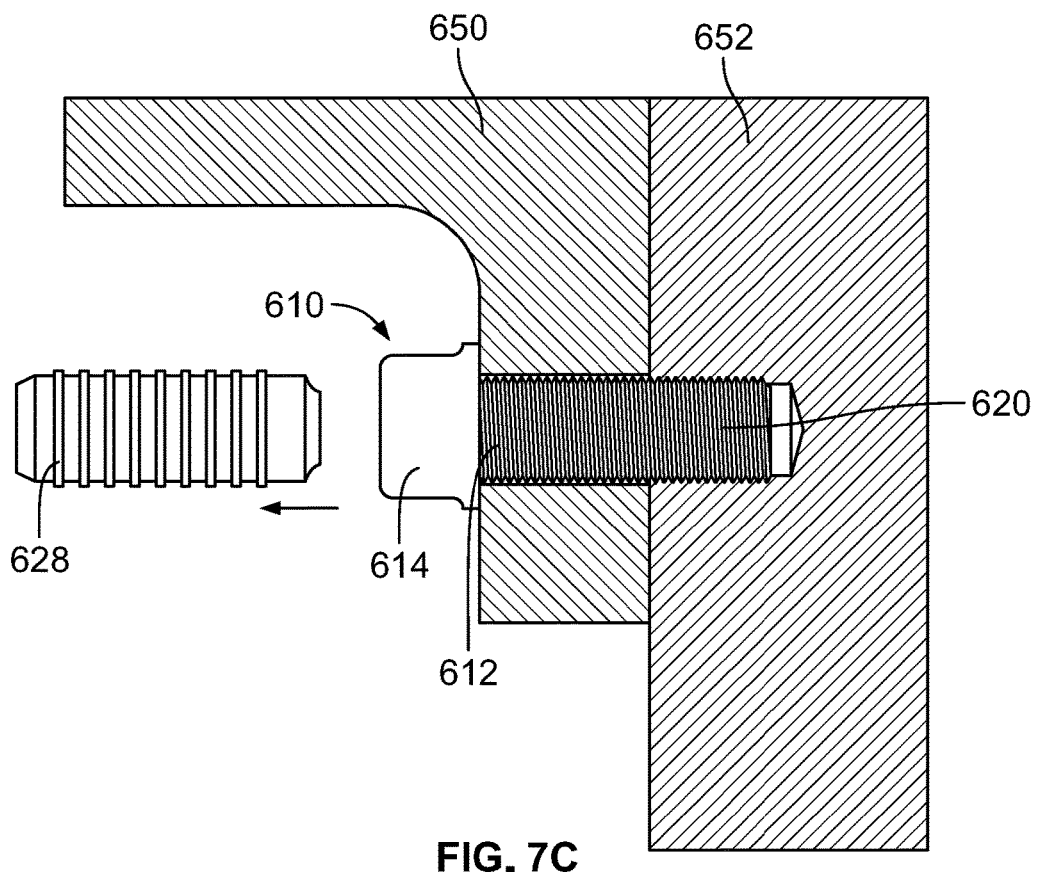

FIGS. 7 through 7C show another embodiment of a fastener 610. Elements shown in FIGS. 7 through 7C which correspond, either identically or substantially, to the elements described above with respect to the embodiment shown in FIGS. 1 through 1C have been designated by corresponding reference numerals increased by six hundred, respectively. Unless otherwise stated, the embodiment shown in FIGS. 7 through 7C is structured and functions in the same manner as the embodiment shown in FIGS. 1 through 1C.

Referring to FIG. 7, in an embodiment, a fastener 610 includes a pin member (or stud) 612 and a swage collar 614 that is sized and shaped to mate with and be swaged onto the pin member 612. For the sake of brevity, the pin member 612 includes a structure and function that is similar to those of the pin member 12, except that a shank portion 616 does not include a smooth cylindrical shank portion (such as, for example, the smooth cylindrical shank portion 18 of the fastener 10) or a lock portion (such as, for example, the lock portion 24 of the fastener 10) that is distinct from that of a threaded portion. Instead, the shank portion 616 includes a threaded portion 620 having a thread 622 that extends from one end of the shank portion 616 to a location adjacent to a breakneck groove 632 positioned intermediate the threaded portion 620 and a pull portion 628. FIGS. 7A through 7C show the installation of the fastener 610 in a plurality of work pieces 650, 652 in a manner similar to the manner of the fastener 10 shown in FIGS. 1A through 1C, with some differences. That is, a portion 635 of the threaded portion 620 and the thread 622 located proximate to the breakneck groove 632 protrude from a face 656 of the work piece 650 when the pin member 612 is installed within the work pieces 650, 652. As shown in FIGS. 7B and 7C, the collar 614 is positioned on and swaged onto the portion 635 of the threaded portion 620 of the pin member 612, and the pull portion 628 is broken off. In an embodiment, the remaining end of the threaded portion 620 is flush or substantially flush with the exposed end of the collar 614, as shown in FIG. 7C.

Figure 8:
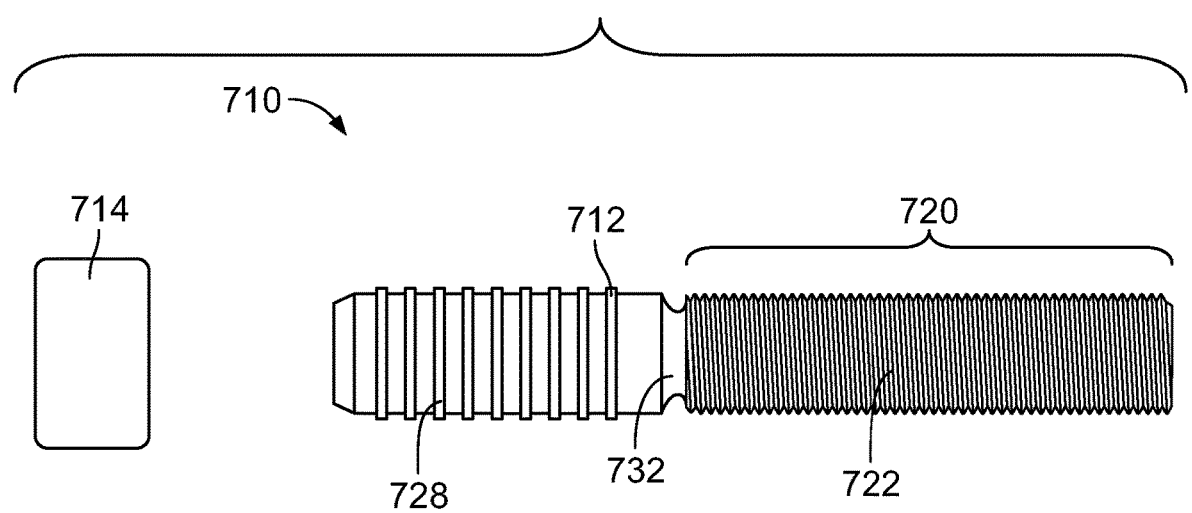
FIGS. 8 through 8C show a fastener in accordance with another embodiment, and its installation within a plurality of workpieces.
Figure 8A:
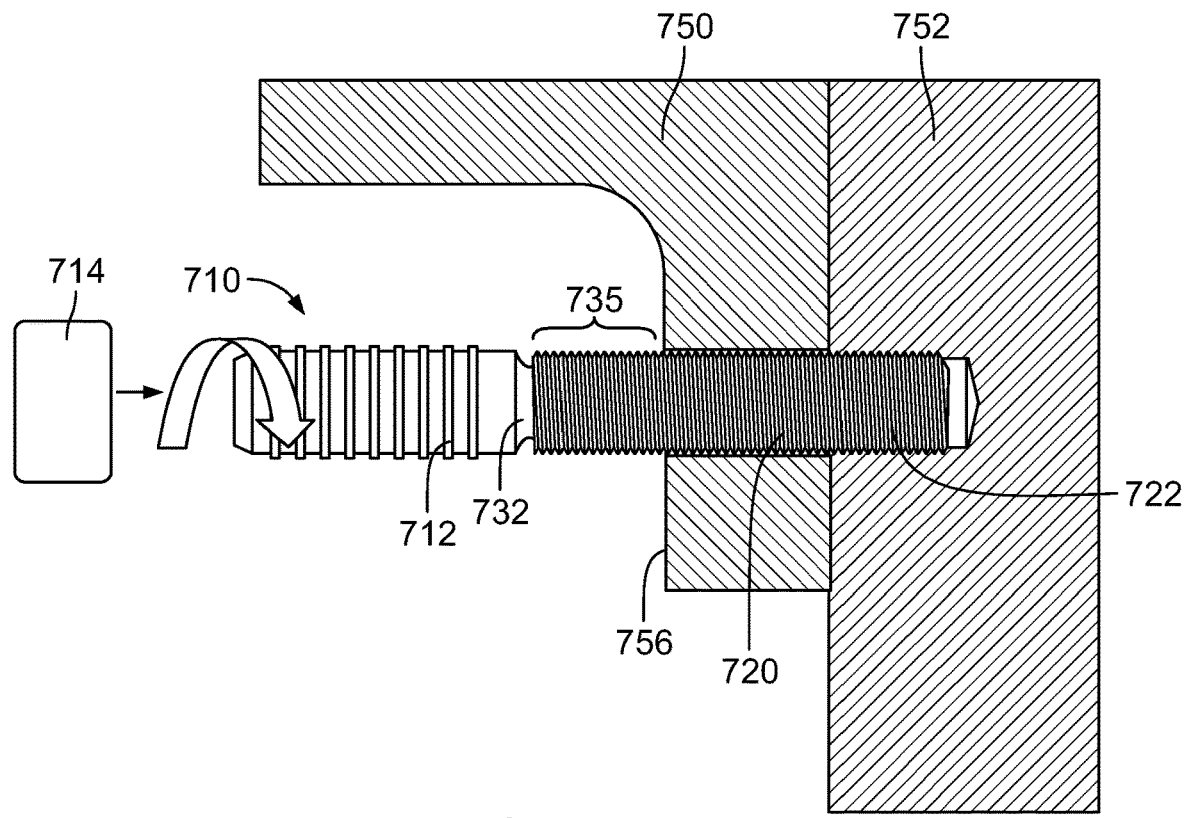
Figure 8B:
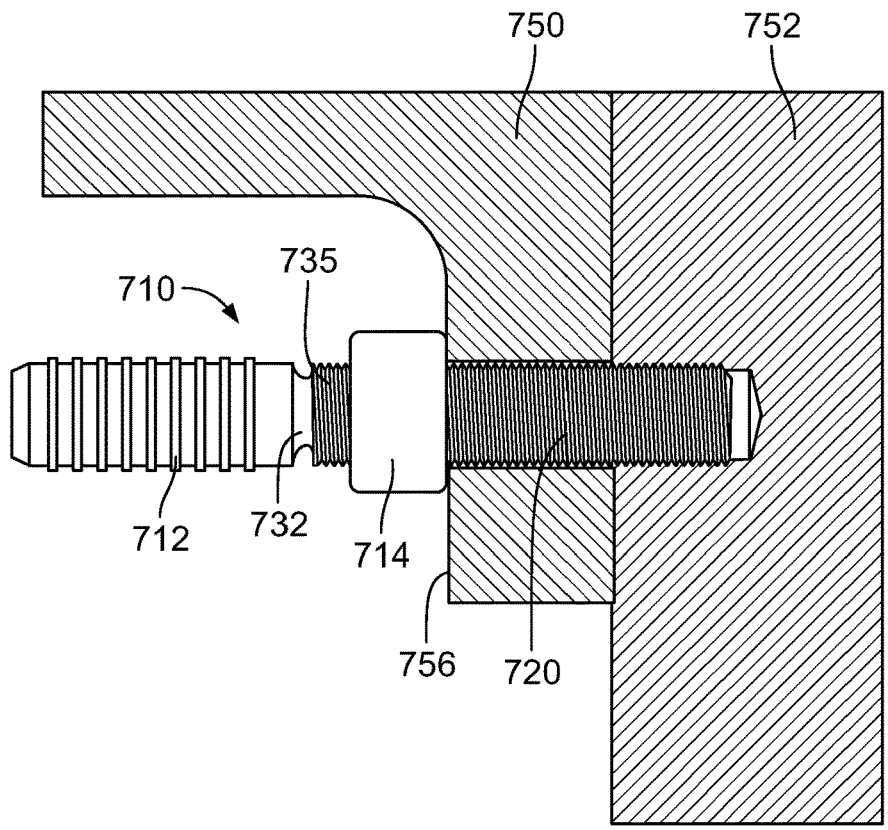
Figure 8C:
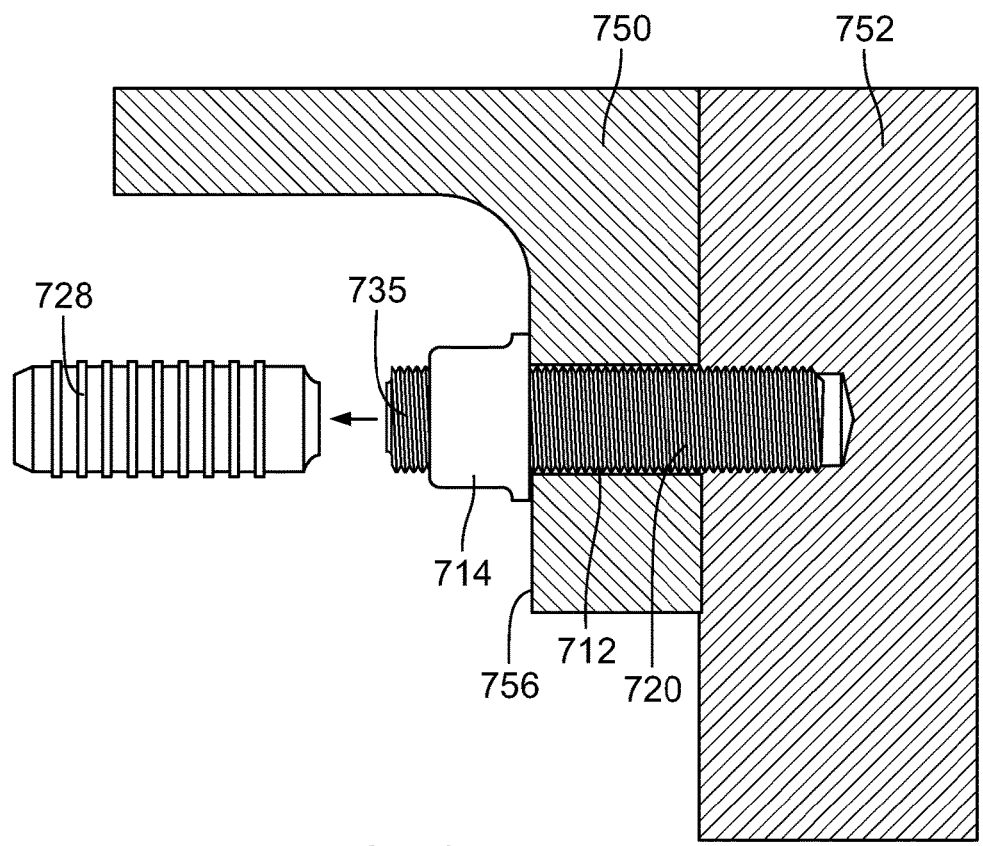

FIGS. 8 through 8C show another embodiment of a fastener 710. Elements shown in FIGS. 8 through 8C which correspond, either identically or substantially, to the elements described above with respect to the embodiment shown in FIGS. 7 through 7C have been designated by corresponding reference numerals increased by one hundred, respectively. Unless otherwise stated, the embodiment shown in FIGS. 8 through 8C is structured and functions in the same manner as the embodiment shown in FIGS. 7 through 7C.

Referring to FIG. 8, in an embodiment, a fastener 710 includes a pin member (or stud) 712 and a swage collar 714 that is sized and shaped to mate with and be swaged onto the pin member 712. For the sake of brevity, the pin member 712 includes a structure and function that is similar to those of the pin member 612, except that a threaded portion 720 is longer in length relative to the threaded portion 620 of the pin member 612. FIGS. 8A through 8C show the installation of the fastener 710 in a plurality of work pieces 750, 752 in a manner similar to the manner of the fastener 610 shown in FIGS. 7A through 7C, with some differences. That is, a larger length of a portion 735 of the threaded portion 720 and the thread 722 located proximate to a breakneck groove 732 protrude from a face 756 of the work piece 750 when the pin member 712 is installed within the work pieces 750, 752, relative to the threaded portion 620 of the pin member 612. As shown in FIGS. 8B and 8C, the collar 714 is positioned on and swaged onto the portion 735 of the threaded portion 720 of the pin member 712, and a pull portion 728 is broken off. In an embodiment, the remaining end of the threaded portion 720 is protrudes from the exposed end of the collar 714, as shown in FIG. 8C.

Figure 9:
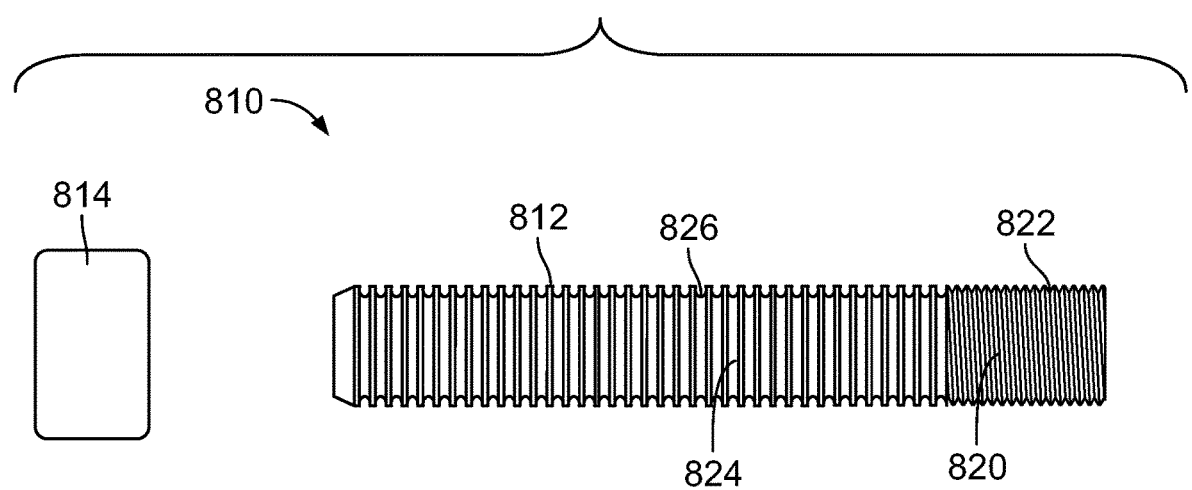
FIGS. 9 through 9C show a fastener in accordance with another embodiment, and its installation within a plurality of workpieces.
Figure 9A:
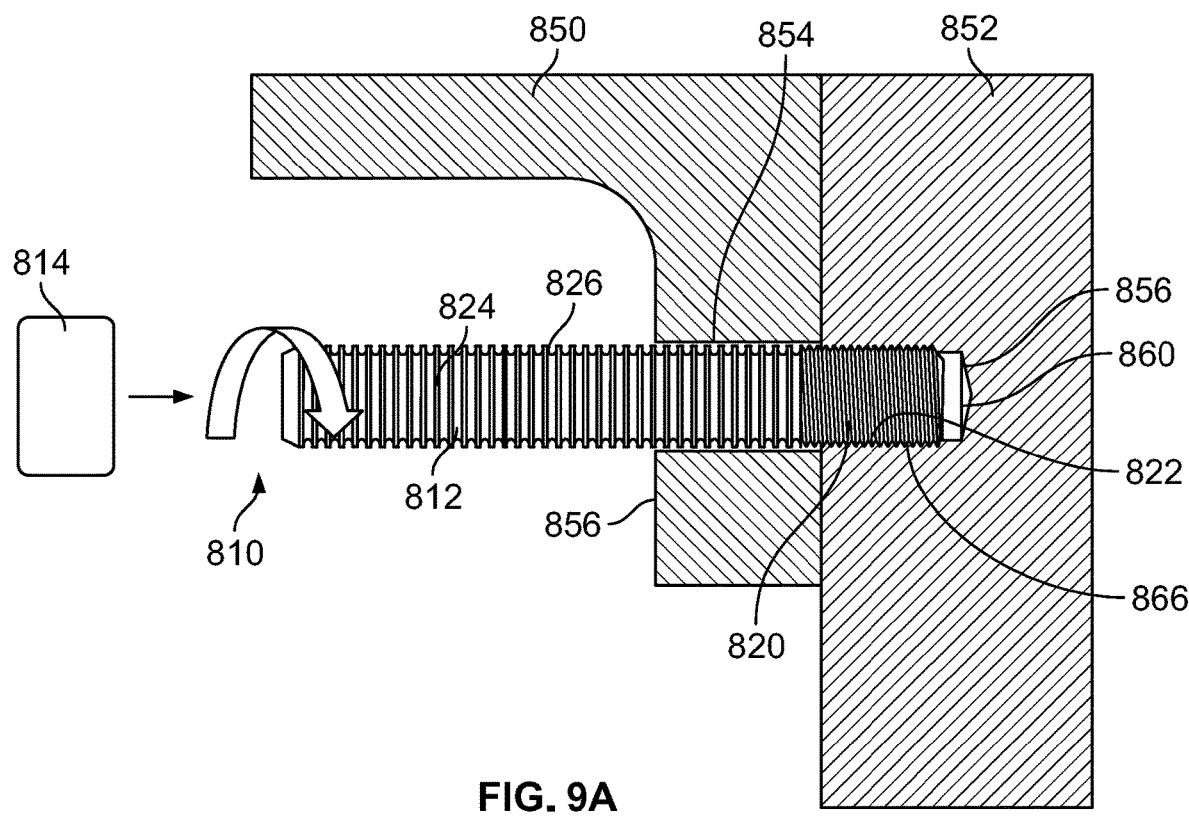
Figure 9B:
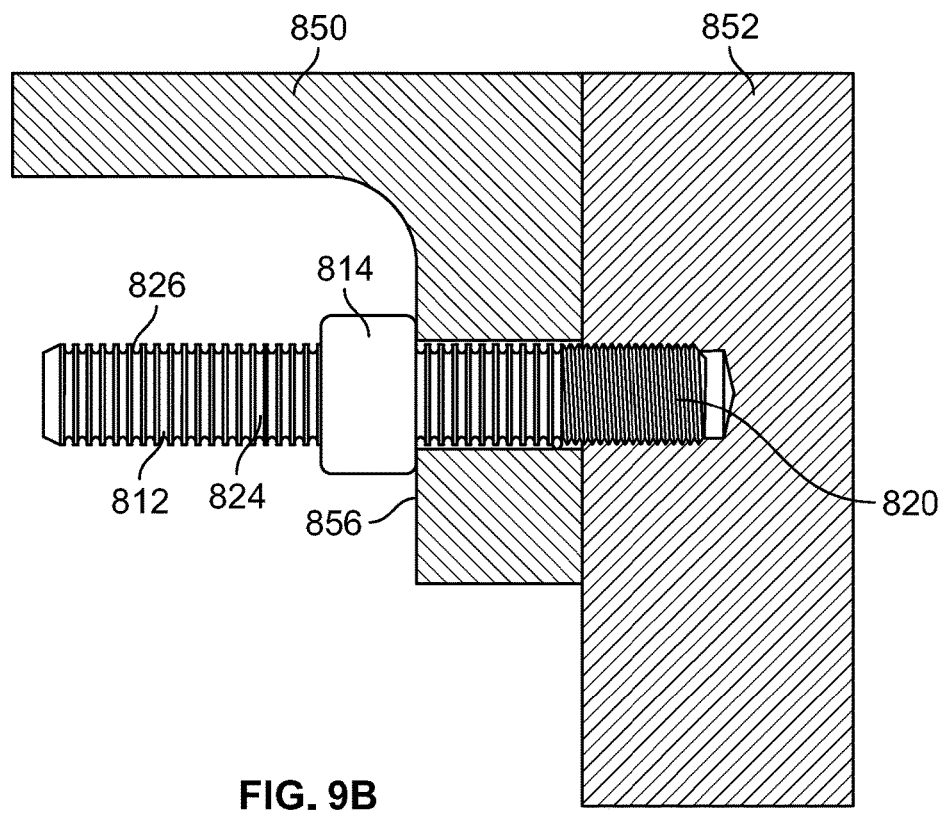
Figure 9C:
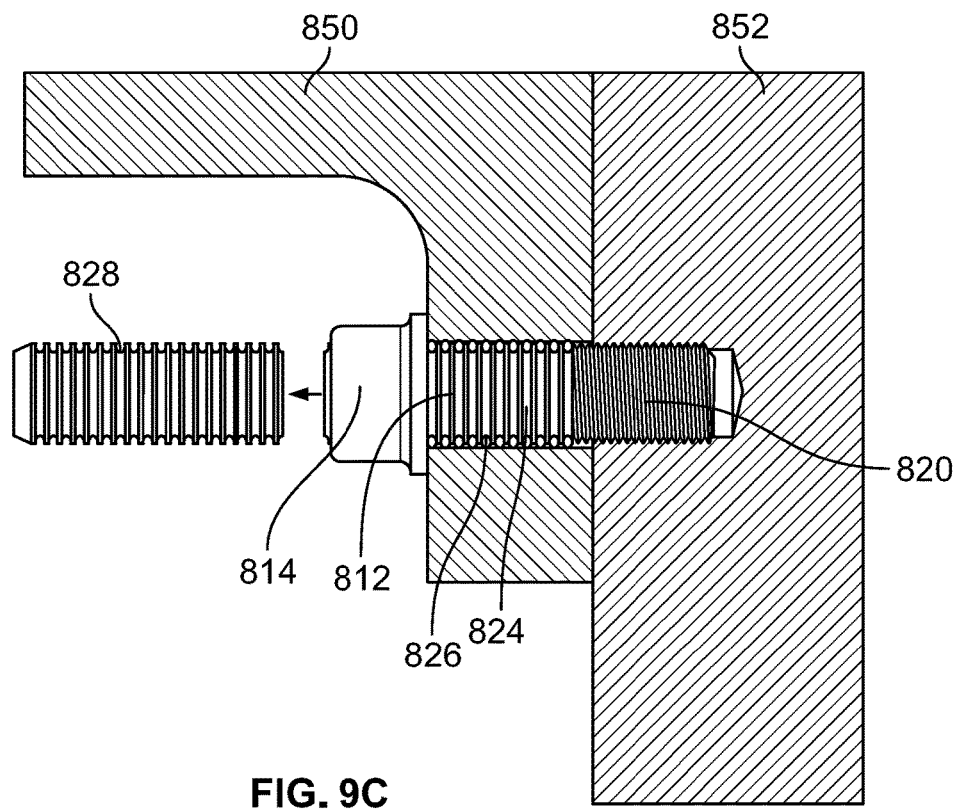

FIGS. 9 through 9C show another embodiment of a fastener 810. Elements shown in FIGS. 9 through 9C which correspond, either identically or substantially, to the elements described above with respect to the embodiment shown in FIGS. 8 through 8C have been designated by corresponding reference numerals increased by one hundred, respectively. Unless otherwise stated, the embodiment shown in FIGS. 9 through 9C is structured and functions in the same manner as the embodiment shown in FIGS. 8 through 8C.

Referring to FIG. 9, in an embodiment, a fastener 810 includes a pin member (or stud) 812 and a swage collar 814 that is sized and shaped to mate with and be swaged onto the pin member 812. In an embodiment, the pin member 812 includes a threaded portion 820 located at one end thereof and a lock portion 824 extending from an opposite end thereof to the threaded portion 820. In an embodiment, the threaded portion 820 includes a thread 822. In an embodiment, the thread 822 is helical. In an embodiment, the lock portion 824 includes a plurality of lock grooves 826. In an embodiment, each of the lock grooves 826 is an annular groove. In an embodiment, the length of the lock portion 824 is greater than the length of the threaded portion 820. In an embodiment, the length of the lock portion 824 is substantially greater than the length of the threaded portion 820.

Referring to FIGS. 9A through 9C, the fastener 810 is adapted to secure a plurality of work pieces 850, 852 to one another. Referring to FIG. 9A, the pin member 812 is installed within the work pieces 850, 852 by inserting it into respective holes 854, 860 thereof, and rotating it therein manually and/or by an appropriate tool, whereby the thread 822 of the threaded portion 820 of the pin member 812 engages threadedly an internal thread 866 of the hole 860 until the pin member 812 is tightened therein. In an embodiment, when the pin member 812 is installed within the work pieces 850, 852, the lock portion 824 and the corresponding lock grooves 826 protrude from the side 856 of the work piece 850. Referring to FIGS. 9B and 9C the collar 814 is installed on the pin member 812 and swaged onto the lock portion 824 and in the lock grooves 826. In an embodiment, a portion of the lock portion 824 breaks off at a selected groove 826 in such a manner that an end of the remainder of the lock portion 824 lies flush or substantially flush with the exposed end of the collar 814.

Figure 10:
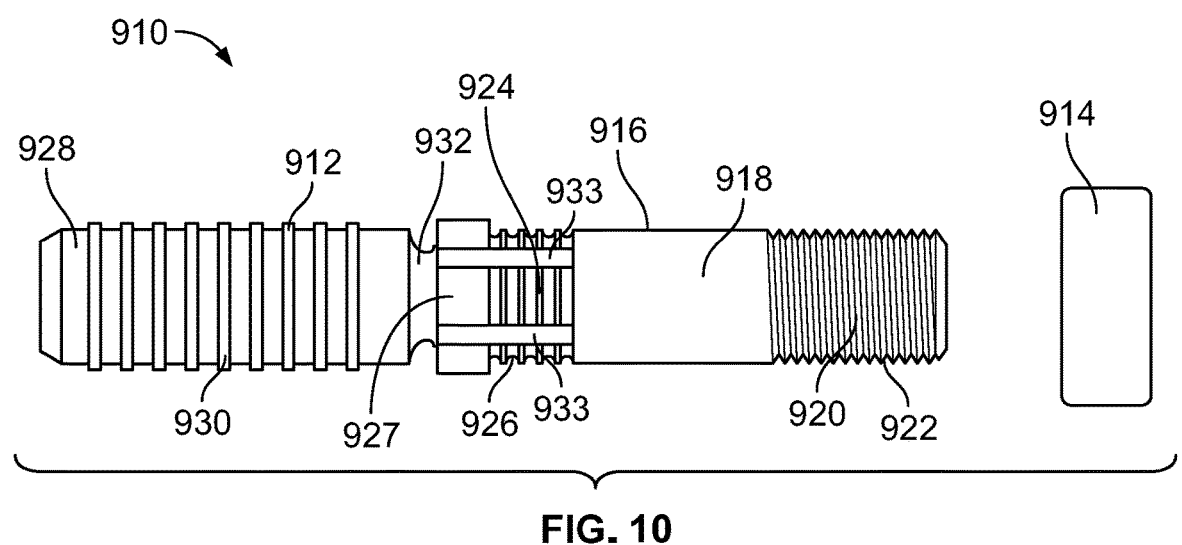
FIGS. 10 through 10C show a fastener in accordance with another embodiment, and its installation within a plurality of workpieces.
Figure 10A:
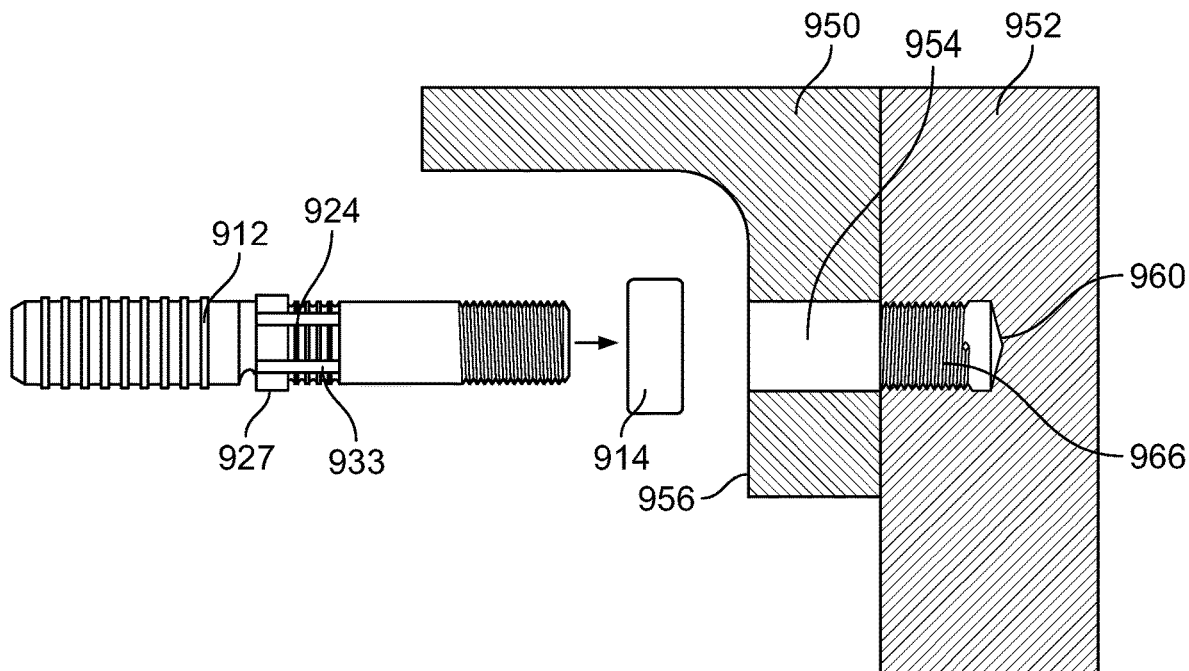
Figure 10B:
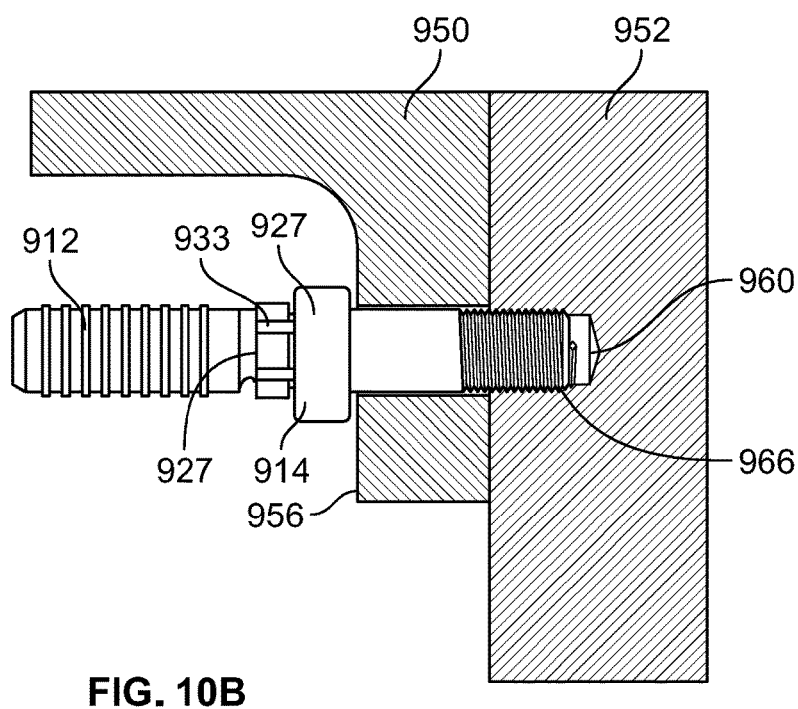
Figure 10C:
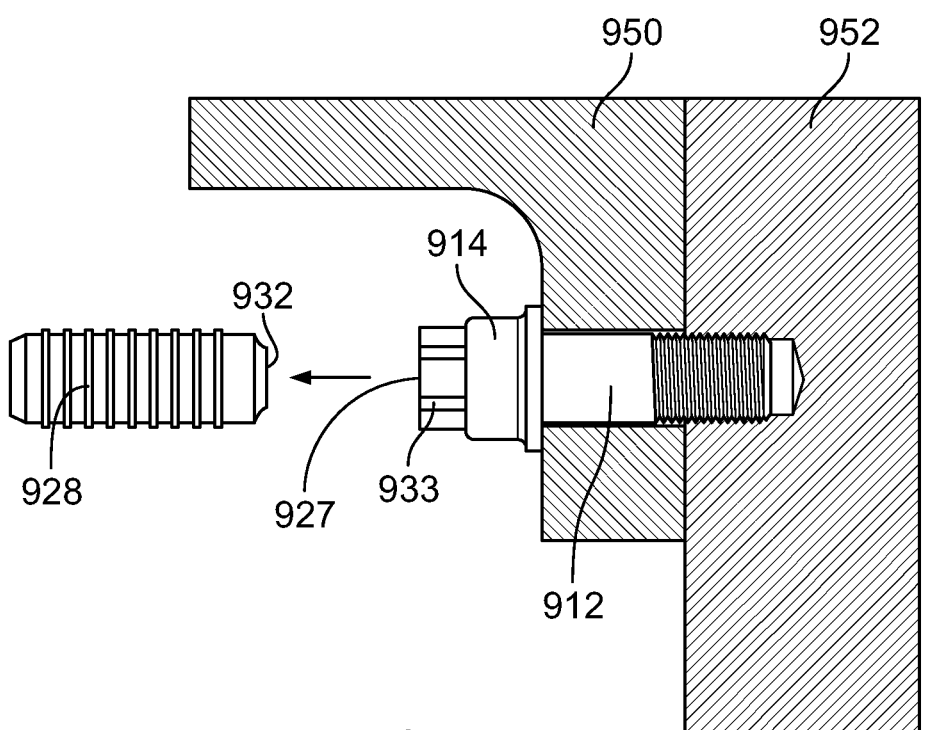

FIGS. 10 through 10C show another embodiment of a fastener 910. Elements shown in FIGS. 10 through 10C which correspond, either identically or substantially, to the elements described above with respect to the embodiment shown in FIGS. 2 through 2D have been designated by corresponding reference numerals increased by eight hundred, respectively. Unless otherwise stated, the embodiment shown in FIGS. 10 through 10C is structured and functions in the same manner as the embodiment shown in FIGS. 2 through 2D.

Referring to FIG. 10, in an embodiment, a fastener 910 includes a pin member (or stud) 912 and a swage collar 914 that is sized and shaped to mate with and be swaged onto the pin member 912. In an embodiment, the pin member 912 includes an elongated shank portion 916 having a smooth cylindrical shank portion 918, a threaded portion 920 located adjacent to one end of the smooth cylindrical shank portion 918 and having a thread 922, and a lock portion 924 located adjacent to an opposite end of the smooth cylindrical shank portion 918 and having a plurality of lock grooves 926. In an embodiment, the shank portion 916 includes a pull portion (pintail portion) 928 having a plurality of pull grooves 930. In an embodiment, the lock portion 924 includes an annular stop 927 located at one end thereof. In an embodiment, a breakneck groove 932 is formed intermediate the annular stop 927 of the lock portion 924 of the shank portion 916 and the pull portion 928. In an embodiment, the annular stop 927 includes an outer diameter that is greater than outer diameter of the remainder of the elongated shank portion 916. In an embodiment, the pin member 912 includes a plurality of grooves 933, each of which is formed within and extends axially from, and on an outer surface of, the stop 927 to, and through an outer surface of, the lock portion 924. In an embodiment, each of the grooves 933 extends longitudinally. In an embodiment, each of the grooves 933 extends from one end of the stop 927 located proximate to the breakneck groove 932 to one end of the lock portion 924 located proximate to the smooth cylindrical shank portion 918. In an embodiment, the pin member 912 may include only one of the grooves 933. In another embodiment, the pin member 912 includes at least one of the grooves 933. In an embodiment, the grooves 933 are adapted to receive a tool for rotating the pin member 912, as described below.

Referring to FIGS. 10A and 10C, the fastener 910 is adapted to secure a plurality of work pieces 950, 952 to one another. In an embodiment, the collar 914 is installed on the pin member 912 such that the collar 914 is positioned over the lock portion 924 and adjacent to and abuts one side of the annular stop 927. The pin member 912 is installed within the work pieces 950, 952 by inserting it into respective holes 954, 960 thereof, and rotating it therein manually and/or by an appropriate tool, whereby the thread 922 of the threaded portion 920 of the pin member 912 engages threadedly the internal thread 966 of the hole 960 until the pin member 912 is tightened therein. In an embodiment, when the pin member 912 is installed within the work pieces 950, 952, the collar 914, which is positioned on the lock portion 924, protrude from a side 956 of the work piece 950, and the collar is sandwiched between the stop 927 and the side 956 of the work piece 950, and thereafter swaged into the lock grooves 926 of the lock portion 924 of the pin member 912. Referring to FIG. 10C, when the fastener 910 is installed, the pull portion 928 breaks off from the pin member 912 at the breakneck groove 932, providing a visual indication that the fastener 910 has been installed. In an embodiment, the pull portion 928 breaks off in such a manner that the remainder of the breakneck groove 932 on the pin member lies flush or substantially flush with the exposed end of the stop 927 of the pin member 912. In addition, the portion of the grooves 933 located on the stop 927 are exposed, and are adapted to receive a tool for tightening or loosening the fastener 910.

Figure 11:
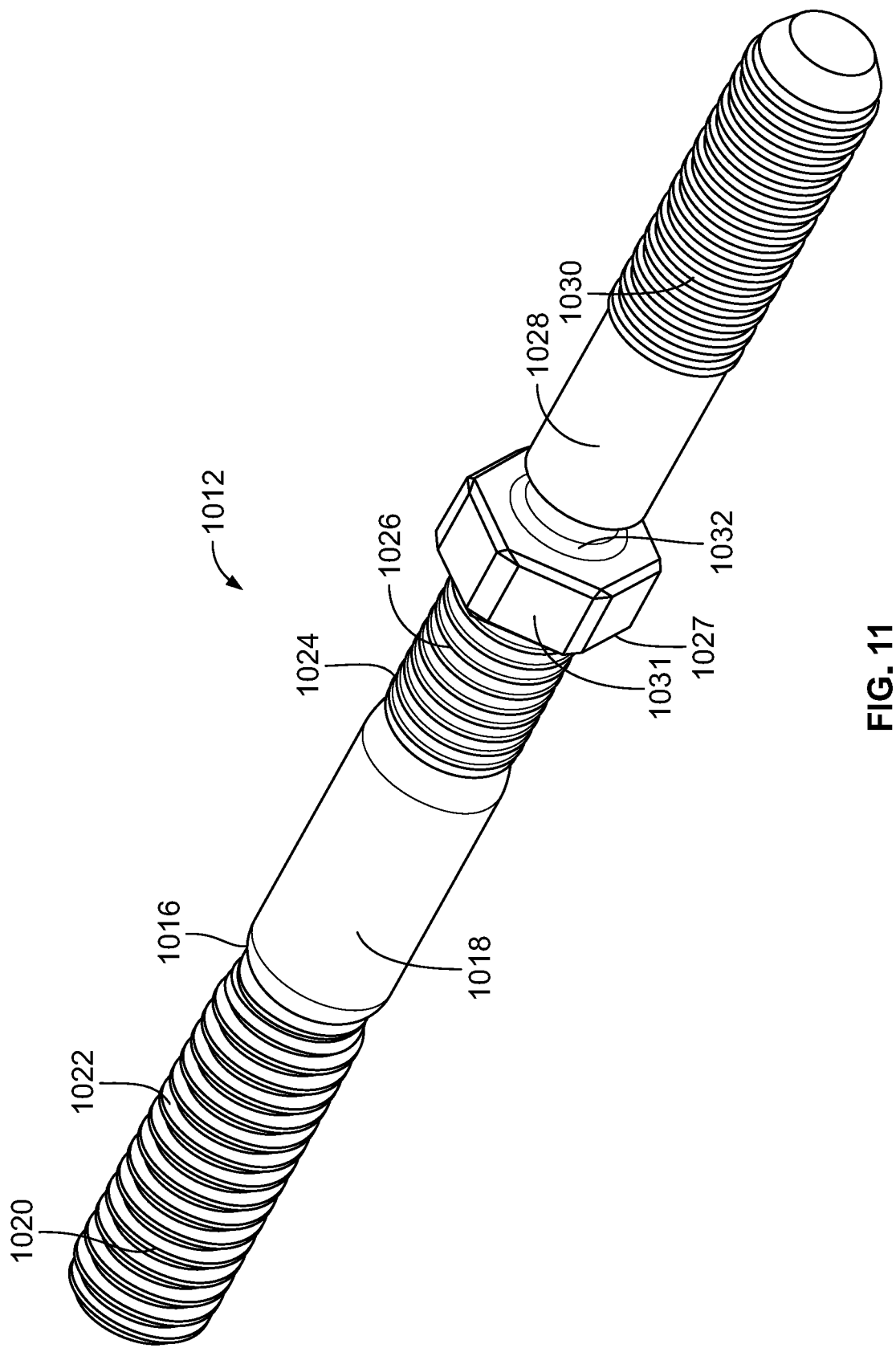
FIGS. 11 and 11A show a fastener in accordance with another embodiment.
Figure 11A:
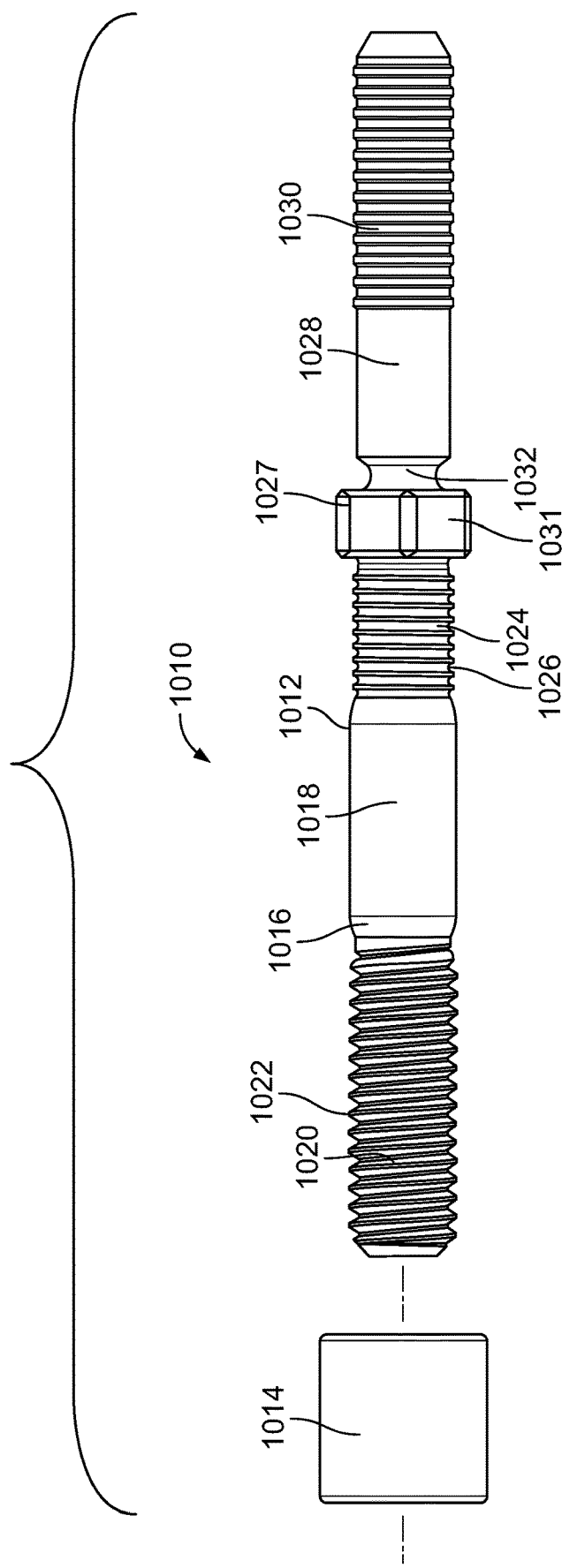

FIGS. 11 and 11A show another embodiment of a fastener 1010. In an embodiment, the fastener 1010 includes a pin member (or stud) 1012 and a swage collar 1014 that is sized and shaped to mate with and be swaged onto the pin member 1012. In an embodiment, the pin member 1012 includes an elongated shank portion 1016. In an embodiment, the shank portion 1016 includes a smooth cylindrical shank portion 1018, a threaded portion 1020 located adjacent to one end of the smooth cylindrical shank portion 1018 and having a thread 1022, and a lock portion 1024 located adjacent to an opposite end of the cylindrical shank portion 1018 and having a plurality of lock grooves 1026. In an embodiment, the lock grooves 1026 are annular grooves. In an embodiment, the threaded portion 1020 includes a single thread 1022. In another embodiment, the lock portion 1024 includes at least one lock groove 1026. In another embodiment, the lock portion 1024 includes a single lock grove 1026. In an embodiment, the shank portion 1016 includes a pull portion (pintail portion) 1028 having a plurality of pull grooves 1030. In an embodiment, the pull grooves 1030 are helical grooves. In another embodiment, the pull grooves 1030 are annular grooves. In an embodiment, the pull grooves 1030 are formed perpendicular to a longitudinal axis A-A of the pin member 1012. In another embodiment, the pull grooves 1030 are formed obliquely to the longitudinal axis A-A of the pin member 1012. In an embodiment, the pull grooves 1030 are formed obliquely to the longitudinal axis A-A of the pin member 1012 and in an angular direction opposite to that of the thread 1022 of the threaded portion 1020. In an embodiment, the pull grooves 1030 are formed obliquely to the longitudinal axis A-A of the pin member 1012 and in an angular direction the same or substantially the same as that of the thread 1022 of the threaded portion 1020. In another embodiment, the pull portion 1028 includes at least one pull groove 1030. In another embodiment, the pull portion 1028 includes a single pull groove 1030. In an embodiment, the lock portion 1024 includes a stop 1027 located at one end thereof. In an embodiment, a breakneck groove 1032 is formed intermediate the stop 1027 of the lock portion 1024 of the shank portion 1016 and the pull portion 1028. In an embodiment, the stop 1027 includes an outer diameter that is greater than outer diameter of the remainder of the elongated shank portion 1016. In an embodiment, the stop 1027 includes plurality of faces 1031 that are adapted to receive an appropriate tool, such as a wrench, for rotating the pin member 1012. In an embodiment, the stop 1027 consists of a hex that includes six faces 1031, as shown in FIGS. 11 and 11A. In other embodiments, the stop 1027 may include more or less than six of the faces 1031, such as four, five, etc. In an embodiment, the stop 1027 acts as a physical stop for the collar 1014 when the collar 1014 is installed thereon, so as to allow to control the tightening depth of the pin member 1012. In an embodiment, the stop 1027 also facilitates tightening of the pin member 1012 in a work piece if the pin member 1012 is to be installed into a threaded locked insert.

In an embodiment, the fastener 1010 may be uninstalled from work pieces by rotating it relative thereto by way of the stop 1027 with the tool. In an embodiment, the collar 1014 is swaged into the lock grooves 1026 of the lock portion 1024 of the pin member 1012 (not shown in the Figures).

In an embodiment, the fasteners 10 through 1010 etc. disclosed herein are able to be installed within holes of associated work pieces with accurate installed preload. This accuracy may lead to weight savings of the work pieces, since the work pieces can be predominantly sized by the preload. In other embodiments, safety margins can be reduced. Installation time can also be reduced. Torque-tension acceptance tension can also be eliminated.

It should be understood that the embodiments described herein are merely exemplary in nature and that a person skilled in the art may make many variations and modifications thereto without departing from the scope of the present invention. All such variations and modifications, including those discussed above, are intended to be included within the scope of the invention.

What is claimed is:

1. A fastener, comprising:
   a pin member including an elongated shank portion having a first end, a second end opposite the first end, a smooth cylindrical shank portion having a first end and a second end opposite the first end of the smooth cylindrical shank portion, a threaded portion located adjacent to the first end of the smooth cylindrical shank portion and proximate to the first end of the elongated shank portion and having a thread, a lock portion located adjacent to the second end of the smooth cylindrical shank portion and having at least one lock groove, and a pull portion located at the second end of the elongated shank portion and having at least one pull groove,
   wherein the lock portion of the pin member includes an annular stop located at one end thereof and proximate to the pull portion of the pin member, wherein the annular stop includes an outer diameter that is greater than an outer diameter of the remainder of the elongated shank portion; and
   a collar received on the lock portion, wherein the annular stop acts as a physical stop for the collar.

2. The fastener of claim 1, wherein the collar is a swage collar adapted to be swaged into the at least one lock groove of the lock portion of the pin member.

3. The fastener of claim 2, wherein the at least one lock groove of the lock portion of the pin member includes a plurality of lock grooves.

4. The fastener of claim 1, wherein the elongated shank portion of the pin member includes a breakneck groove located intermediate the lock portion and the pull portion.

5. The fastener of claim 4, wherein the pull portion is adapted to break off from the pin member at the breakneck groove.

6. The fastener of claim 1, wherein the at least one pull groove of the pull portion of the pin member includes a plurality of pull grooves.

7. The fastener of claim 1, wherein the fastener is adapted to secure at least first and second workpieces to one another, wherein the first workpiece includes a hole extending from a first side thereof to a second side thereof opposite the first side, the hole being sized and shaped to receive the pin member therethrough, and wherein the second workpiece includes a threaded hole extending within a first side thereof, the threaded hole being sized and shaped and adapted to receive threadedly the thread of the threaded portion of the pin member when the pin member is in an installed position.

8. The fastener of claim 7, wherein the lock portion of the pin member protrudes from the first side of the first workpiece and the collar is adapted to be positioned on the lock portion of the pin member and adjacent to the first side of the first workpiece when the pin member is in its installed position.

9. The fastener of claim 1, further comprising a plurality of grooves each of which extends axially from and on an outer surface of the annular stop to and on an outer surface of the lock portion.

10. The fastener of claim 1, wherein the annular stop includes gripping means adapted to facilitate the gripping and rotation of the fastener from an installed position of the fastener to an uninstalled position of the fastener.

11. The fastener of claim 10, wherein the gripping means includes a plurality of faces adapted to receive a fastener tool.

* * * * *